(12) United States Patent
Wong et al.

(10) Patent No.: US 11,994,067 B2
(45) Date of Patent: *May 28, 2024

(54) GAS TURBINE ENGINE

(71) Applicant: ROLLS-ROYCE plc, London (GB)

(72) Inventors: Natalie C Wong, Bristol (GB); Jonathan A Cherry, Bristol (GB); Paul R Davies, Bristol (GB); David A Jones, Bristol (GB); Andrew J Newman, Bristol (GB); Benjamin J Sellers, Bath (GB); Stephen J Bradbrook, Clevedon (GB)

(73) Assignee: ROLLS-ROYCE PLC, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/940,055

(22) Filed: Sep. 8, 2022

(65) Prior Publication Data

US 2023/0167768 A1    Jun. 1, 2023

(51) Int. Cl.
*F02C 7/12* (2006.01)
*F02C 6/20* (2006.01)
*F02C 7/32* (2006.01)

(52) U.S. Cl.
CPC ............... *F02C 7/12* (2013.01); *F02C 6/20* (2013.01); *F02C 7/32* (2013.01);
(Continued)

(58) Field of Classification Search
CPC .... F01D 15/10; F02C 6/20; F02C 7/12; F02C 7/14; F02C 7/18; F02C 7/32; F02K 3/04;
(Continued)

(56) References Cited

U.S. PATENT DOCUMENTS

| 3,204,404 A | 9/1965 | Jean et al. |
| 3,514,954 A | 6/1970 | Colley |

(Continued)

FOREIGN PATENT DOCUMENTS

| CA | 3 024 225 C | 10/2020 |
| EP | 731316 A1 | 9/1996 |

(Continued)

OTHER PUBLICATIONS

Jun. 16, 2022 Search Report issued in British Patent Application No. GB2112773.3.

(Continued)

*Primary Examiner* — Jesse S Bogue
(74) *Attorney, Agent, or Firm* — Oliff PLC

(57) ABSTRACT

An aircraft gas turbine engine includes a heat exchanger module, and a core engine including an intermediate-pressure compressor, a high-pressure compressor, a high pressure turbine, and a low-pressure turbine. The high-pressure compressor is connected to the high-pressure turbine by a first shaft, and the intermediate-pressure compressor is connected to the low-pressure turbine by a second shaft. The heat exchanger module includes a central hub and heat transfer elements extending radially from the central hub and spaced in a circumferential array, for transferring heat energy from a fluid within the heat transfer elements to an inlet airflow passing over the heat transfer elements prior to entry of the airflow into an inlet to the core engine. The gas turbine engine further includes a first electric machine connected to the first shaft and positioned downstream of the heat exchanger module, and a second electric machines connected to the second shaft.

14 Claims, 9 Drawing Sheets

(52) U.S. Cl.
CPC .... *F05D 2220/323* (2013.01); *F05D 2220/76* (2013.01); *F05D 2260/213* (2013.01)

(58) Field of Classification Search
CPC .......... F05D 2220/323; F05D 2220/76; F05D 2220/766; F05D 2240/12; F05D 2260/213; F05D 2260/42; Y02T 50/60
See application file for complete search history.

(56) References Cited

U.S. PATENT DOCUMENTS

| | | | |
|---|---|---|---|
| 3,705,775 A | 12/1972 | Rioux | |
| 4,782,658 A | 11/1988 | Perry | |
| 4,827,712 A * | 5/1989 | Coplin | F02K 3/06 60/751 |
| 4,900,221 A | 2/1990 | Ciokajlo et al. | |
| 4,914,904 A | 4/1990 | Parnes et al. | |
| 5,794,432 A * | 8/1998 | Dunbar | F02K 1/16 60/226.1 |
| 7,448,199 B2 | 11/2008 | Johnson | |
| 7,621,117 B2 | 11/2009 | Dooley et al. | |
| 10,184,401 B2 | 1/2019 | Bellabal | |
| 10,308,365 B2 | 6/2019 | Cantemir | |
| 10,583,932 B1 | 3/2020 | Stretton et al. | |
| 10,648,475 B1 * | 5/2020 | Stretton | F04D 19/002 |
| 10,690,147 B2 | 6/2020 | Hiernaux | |
| 10,826,343 B2 | 11/2020 | Moore et al. | |
| 11,077,949 B2 | 8/2021 | Behrens et al. | |
| 11,077,953 B2 | 8/2021 | Harvey | |
| 11,597,527 B2 | 3/2023 | Kupratis et al. | |
| 2005/0183529 A1 | 8/2005 | Miller | |
| 2007/0125093 A1 | 6/2007 | Burd et al. | |
| 2009/0178412 A1 | 7/2009 | Spytek | |
| 2010/0320850 A1 | 12/2010 | Lemmers, Jr. et al. | |
| 2011/0088405 A1 | 4/2011 | Turco | |
| 2012/0198817 A1 | 8/2012 | Suciu et al. | |
| 2014/0044525 A1 | 2/2014 | Storage et al. | |
| 2014/0260303 A1 | 9/2014 | Davis, Jr. et al. | |
| 2016/0023773 A1 | 1/2016 | Himmelmann et al. | |
| 2016/0084265 A1 | 3/2016 | Yu et al. | |
| 2017/0051667 A1 | 2/2017 | Godman | |
| 2017/0335715 A1 | 11/2017 | Youssef et al. | |
| 2017/0362999 A1 | 12/2017 | Abe et al. | |
| 2018/0030902 A1 | 2/2018 | Kraft et al. | |
| 2018/0080688 A1 | 3/2018 | Snape et al. | |
| 2018/0138766 A1 | 5/2018 | Moore et al. | |
| 2018/0209292 A1 | 7/2018 | Hiernaux | |
| 2018/0216576 A1 | 8/2018 | Miller et al. | |
| 2018/0354632 A1 | 12/2018 | Hon et al. | |
| 2019/0061962 A1 | 2/2019 | Nolcheff et al. | |
| 2019/0085765 A1 | 3/2019 | Nolcheff et al. | |
| 2019/0344898 A1 | 11/2019 | Scothern | |
| 2019/0344900 A1 | 11/2019 | Harvey | |
| 2020/0100399 A1 | 3/2020 | Pal | |
| 2020/0102914 A1 | 4/2020 | Moss et al. | |
| 2020/0116359 A1 | 4/2020 | Whurr et al. | |
| 2020/0141332 A1 | 5/2020 | Griffiths | |
| 2020/0173369 A1 | 6/2020 | Husband et al. | |
| 2020/0191010 A1 | 6/2020 | Tan-Kim et al. | |
| 2020/0355121 A1 * | 11/2020 | O'Meallie | F02C 9/18 |
| 2020/0392903 A1 | 12/2020 | Turner | |
| 2020/0392924 A1 * | 12/2020 | Turner | F02K 3/075 |
| 2021/0108573 A1 | 4/2021 | Sibbach et al. | |
| 2021/0254493 A1 | 8/2021 | Jones et al. | |
| 2021/0270148 A1 * | 9/2021 | Marchaj | F02C 7/14 |
| 2022/0251964 A1 | 8/2022 | Drozd et al. | |
| 2022/0333553 A1 * | 10/2022 | Zatorski | F02K 3/06 |

FOREIGN PATENT DOCUMENTS

| | | |
|---|---|---|
| EP | 1 031 715 A2 | 8/2000 |
| EP | 2 527 603 A2 | 11/2012 |
| EP | 3 153 690 A1 | 4/2017 |
| EP | 3 296 665 A1 | 3/2018 |
| EP | 3 460 219 A1 | 3/2019 |
| EP | 3 534 101 A1 | 9/2019 |
| EP | 3 561 277 A2 | 10/2019 |
| EP | 3 674 220 A1 | 7/2020 |
| EP | 3 832 089 A1 | 6/2021 |
| FR | 3 103 854 A1 | 6/2021 |
| GB | 2589125 A | 5/2021 |
| WO | 2014/055102 A1 | 4/2014 |

OTHER PUBLICATIONS

GE Aviation. "The LM6000 Engine," https://www.geaviation.com/propulsion/marine/lm6000, Jun. 21, 2022, 4 pages.

Jun. 13, 2022 Search Report issued in British Patent Application No. GB2112772.5.

Jun. 28, 2022 Combined Examination and Search Report issued in British Patent Application No. GB2112776.6.

Jun. 27, 2022 Combined Examination and Search Report issued in British Patent Application No. GB2112774.1.

Jun. 1, 2022 Combined Examination and Search Report issued in British Patent Application No. GB2112778.2.

Heldenbrand et al.; "Airesearch QCGAT engine, airplane, and nacelle design features"; Mar. 1, 1980; https://ntrs.nasa.gov/api/citations/19800013841/downloads/19800013841.pdf; retrieved on Apr. 29, 2022.

D.F. Howard; "Quiet Clean Short-Haul Experimental Engine (QCSEE) Preliminary Under the Wing Flight Propulsion System Analysis Report"; Feb. 1, 1976; https://ntrs.nasa.gov/archive/nasa/casi.ntrs.nasa.gov/19800006829.pdf; retrieved on May 13, 2019.

William U. Borger; "Application of Rare Earth/Transition Metal Permanent Magnets to 400 Hz Aircraft Systems—An AF Overview"; Proceedings of the IEEE 1978 National Aerospace and Electronics Conference NAECON 78 Held at the Dayton Convention Center May 16-18; vol. 2; May 16, 1978; pp. 757-764.

Jun. 10, 2022 Search Report issued in British Patent Application No. GB2112771.7.

Jun. 1, 2022 Combined Examination and Search Report issued in British Patent Application No. GB2112777.4.

Secunde et al.; "Integrated Engine-Generator Concept for Aircraft Electric Secondary Power"; NASA Technical Memorandum TM X-2579; Jun. 1, 1972; https://core.ac.uk/download/pdf/80646645.pdf; retrieved on Apr. 29, 2022.

May 17, 2022 Search Report issued in British Patent Application No. GB2112779.0.

Jun. 27, 2022 Combined Search and Examination Report issued in British Patent Application No. GB2112775.8.

Dale Rauch; "Design Study of an Air Pump and Integral Lift Engine ALF-504 Using the Lycoming 502 Core"; NASA Report CR-120992; 1972; figure 10, pp. 61.

Gliebe et al, "Ultra-High Bypass Engine Aeroacoustic Study"; NASA/CR-2003-212525; 2003; figures 4, 32.

U.S. Appl. No. 17/940,419, filed Sep. 8, 2022 in the name of Sellers et al.

U.S. Appl. No. 17/940,473, filed Sep. 8, 2022 in the name of Newman et al.

U.S. Appl. No. 17/940,531, filed Sep. 8, 2022 in the name of Sellers et al.

U.S. Appl. No. 17/940,030, filed Sep. 8, 2022 in the name of Sellers et al.

U.S. Appl. No. 17/940,035, filed Sep. 8, 2022 in the name of Sellers et al.

U.S. Appl. No. 17/940,046, filed Sep. 8, 2022 in the name of Gallagher et al.

U.S. Appl. No. 17/940,034, filed Sep. 8, 2022 in the name of Sellers et al.

U.S. Appl. No. 17/940,042, filed Sep. 8, 2022 in the name of Gallagher et al.

Apr. 27, 2023 Office Action issued in U.S. Appl. No. 17/940,035.

Jan. 27, 2023 Extended Search Report issued in European Patent Application No. EP 22192749.4.

Jan. 25, 2023 Extended Search Report issued in European Patent Application No. EP 22192757.7.

Jan. 25, 2023 Extended Search Report issued in European Patent Application No. EP 22192755.1.

(56) References Cited

OTHER PUBLICATIONS

Jan. 25, 2023 Extended Search Report issued in European Patent Application No. EP 22192756.9.
Jan. 27, 2023 Extended Search Report issued in European Patent Application No. EP 22192748.6.
Feb. 1, 2023 Extended Search Report issued in European Patent Application No. EP 22192751.0.
Feb. 8, 2023 Extended Search Report issued in European Patent Application No. EP 22192754.4.
Feb. 8, 2023 Extended Search Report issued in European Patent Application No. EP 22192753.6.
Feb. 8, 2023 Extended Search Report issued in European Patent Application No. EP 22192752.8.
Jul. 20, 2023 Office Action Issued In U.S. Appl. No. 17/940,034.
Aug. 18, 2023 Office Action issued in U.S. Appl. No. 17/940,035.
Aug. 30, 2023 Office Action issued in U.S. Appl. No. 17/940,473.
Naylor et al., "Optimization of Nonaxisymmetric Endwalls in Compressor S-shaped Ducts", Journal of Turbomachinery, Jan. 2010, vol. 132, pp. 1-11. (Year: 2010).
Karakasis et al., "The Effect of an Upstream Compressor on a Non-axisymmetric S-duct", vol. 7: Turbomachinery, Parts A, B, and C, GT2010-23404, Proceedings of ASME Turbo Expo 2010: Power for Land, Sea, and Air, Glasgow, UK, Jun. 2010, pp. 1-10. (Year: 2010).
Oct. 12, 2023 Office Action issued in U.S. Appl. No. 17/940,046.
Oct. 6, 2023 Office Action issued in U.S. Appl. No. 17/940,034.
Nov. 3, 2023 Office Action issued in U.S. Appl. No. 17/940,030.
Nov. 3, 2023 Office Action issued in U.S. Appl. No. 17/940,419.
Dec. 8, 2023 Office Action issued in U.S. Appl. No. 17/940,035.
Jan. 4, 2024 Notice of Allowance issued in U.S. Appl. No. 17/940,034.
Mar. 15, 2024 Office Action issued in U.S. Appl. No. 17/940,531.
Chapman, J. W. et al. "Practical Techniques for Modeling Gas Turbine Engine Performance", NASA/TM 2016-219147, 2016.
Secunde, R. R. "Integrated Engine-Generator for Aircraft Secondary Power", NASA-TM X-68139, Dec. 1972.
Mar. 20, 2024 Notice of Allowance issued in U.S. Appl. No. 17/940,046.
Mar. 21, 2024 Notice of Allowance issued in U.S. Appl. No. 17/940,030.
Mar. 22, 2024 Office Action issued in U.S. Appl. No. 17/940,473.
Mar. 29, 2024 Office Action issued in U.S. Appl. No. 17/940, 035.

\* cited by examiner

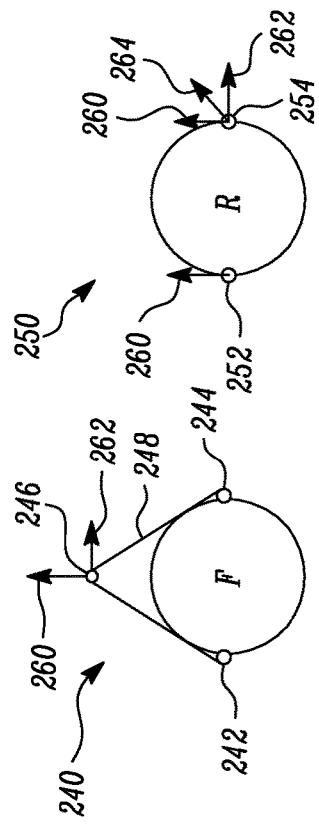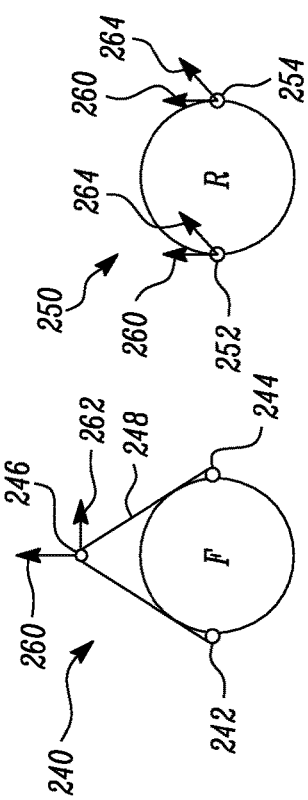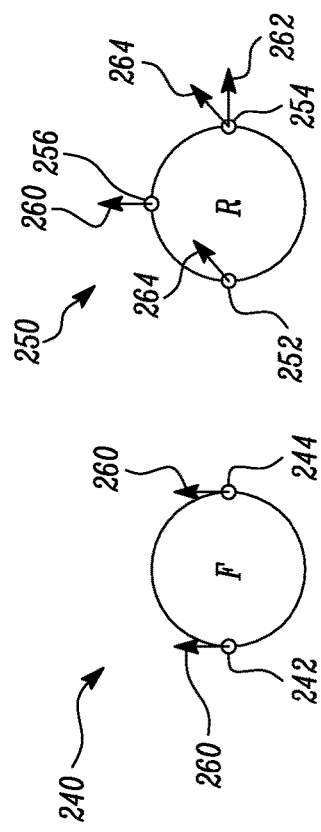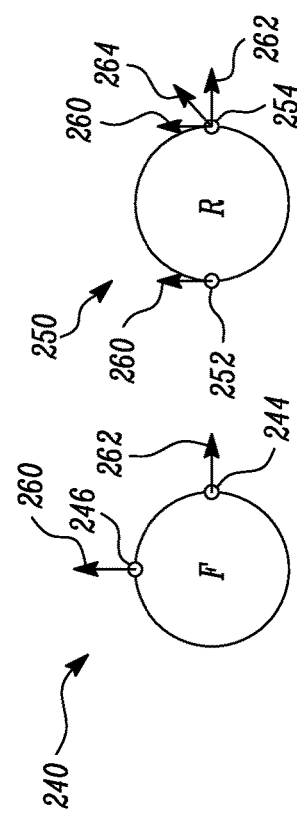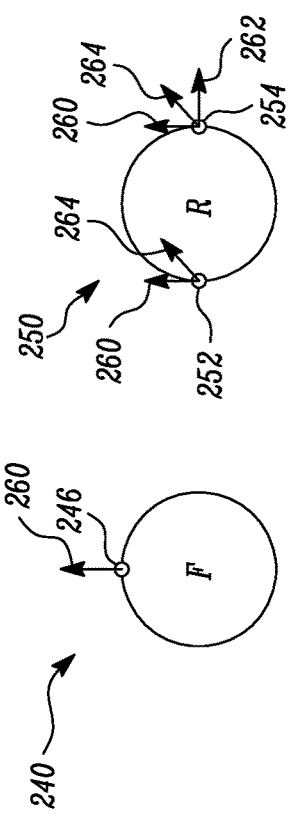

GAS TURBINE ENGINE

FIELD OF THE DISCLOSURE

The present disclosure relates to an improved gas turbine engine and particularly, but not exclusively, to an improved turbofan gas turbine engine.

BACKGROUND TO THE DISCLOSURE

A conventional gas turbine engine, such as a turboprop or turbofan gas turbine engine, uses heat exchangers to cool a variety of fluids including inter alia air, fuel and oil.

In a typical turbofan engine, such heat exchangers use bypass air or an air offtake from the compressor as the cooling medium. The heat exchanger itself may be positioned in the bypass duct or externally to the engine with the corresponding ducting.

The use of bypass air or a compressor offtake stream as the cooling medium in a heat exchanger will adversely affect the performance of the engine, for example by reducing specific thrust or increasing specific fuel consumption. Alternatively, or additionally, such offtakes can adversely affect engine performance, for example by reducing surge margin.

In a further alternative conventional arrangement, an airflow to provide the cooling medium in a heat exchanger may be drawn separately from the airflow through the gas turbine engine. For example, in an airframe application the airflow providing the cooling medium may be drawn from an air intake or duct separate from the engine.

As used herein, a range "from value X to value Y" or "between value X and value Y", or the likes, denotes an inclusive range; including the bounding values of X and Y. As used herein, the term "axial plane" denotes a plane extending along the length of an engine, parallel to and containing an axial centreline of the engine, and the term "radial plane" denotes a plane extending perpendicular to the axial centreline of the engine, so including all radial lines at the axial position of the radial plane. Axial planes may also be referred to as longitudinal planes, as they extend along the length of the engine. A radial distance or an axial distance is therefore a distance in a radial or axial plane, respectively.

Statements of Disclosure

According to a first aspect of the present disclosure, there is provided a turbofan gas turbine engine for an aircraft, the gas turbine engine comprising, in axial flow sequence, a fan assembly, a compressor module, and a turbine module, with a first electric machine being positioned downstream of the fan assembly and being rotationally connected to the turbine module, the fan assembly comprises a highest pressure fan stage having a plurality of fan blades extending radially from a hub, the plurality of fan blades defining a fan diameter ($D_{FAN}$), each fan blade having a leading edge and a trailing edge, and the turbine module comprises a lowest pressure turbine stage having a row of rotor blades, with each of the rotor blades extending radially and having a leading edge and a trailing edge, and wherein the gas turbine engine has a fan tip axis that joins a radially outer tip of the leading edge of one of the plurality of fan blades of the highest pressure fan stage, and the radially outer tip of the trailing edge of one of the rotor blades of the lowest pressure turbine stage, the fan tip axis lying in a longitudinal plane which contains a centreline of the gas turbine engine, and a fan axis angle is defined as the angle between the fan tip axis and the centreline, and the fan axis angle is in a range between 11 degrees and 20 degrees.

The fan axis angle defines a geometrical relationship between the outer diameter of the highest pressure stage of the fan assembly, the outer diameter of the lowest pressure stage of the turbine assembly, and the axial length between the highest pressure fan stage and the lowest pressure turbine stage.

The highest pressure fan stage is the most axially rearward of the fan stages, where there are multiple fan stages, or simply the fan stage if there is a single fan stage. In this context, axially rearward means towards the rear, or exhaust, of the engine.

Likewise, the lowest pressure turbine stage is the most axially rearward of the turbine stages, where there are multiple turbine stages, or simply the turbine stage if there is a single turbine stage. In this context, axially rearward means towards the rear, or exhaust, of the engine.

The claimed range of between 11 degrees and 20 degrees for the fan axis angle results in a turbofan engine that is shorter than a conventional turbofan engine with a comparable fan diameter. This makes the turbofan engine more easily packaged into a machine body b a user.

Optionally, the fan axis angle is in a range between 12 degrees and 17 degrees.

Optionally, the fan axis angle is in a range between 13 degrees and 16 degrees.

Optionally, the first electric machine comprises an axial length $L_{EM}$ and a diameter $D_{EM}$, and a ratio of the axial length to the diameter ($L_{EM}/D_{EM}$) for the first electric machine is in a range between 0.5 to 2.0.

By sizing the first electric machine with a length to diameter ratio in the range of 0.5 to 2.0, it becomes possible to accommodate the electric machine radially within the compressor module. This in turn enables the axial length of the gas turbine engine to be reduced, which makes the engine more convenient for packaging by a user into a machine body.

Optionally, the ratio of $L_{EM}/D_{EM}$ is in a range between 0.5 to 0.95.

Optionally, a downstream end of the first electric machine does not extend axially beyond an inlet plane of the compressor module.

In one arrangement of the disclosure, the first electric machine is accommodated radially inwardly of an intermediate duct that fluidly connects the fan assembly to the compressor assembly. By positioning the first electric machine upstream of the inlet plane of the compressor assembly it is possible to minimise the diameters of the turbine assembly and so keep the turbine assembly compact in size.

Optionally, the fan comprises two or more fan stages, and the fan tip axis is defined as joining the radially outer tip of the leading edge of one of the plurality of fan blades of the lowest-pressure fan stage, and the radially outer tip of the trailing edge of one of the rotor blades of the lowest pressure stage of the turbine.

In one arrangement, the fan assembly has two fan stages with both fan stages comprising a plurality of fan blades defining the same fan diameter. Alternatively, each of the fan stages may have different fan diameters.

Optionally, the fan diameter $D_{FAN}$ is within the range of 0.3 m to 2.0 m, preferably within the range 0.4 m to 1.5 m, and more preferably in the range of 0.7 m to 1.0 m.

In one embodiment of the disclosure, the fan diameter is 0.9 m.

Consequently, for the same heat energy loading rejected to the air flow through the heat exchanger, the loss in propulsive efficiency of the turbofan engine is proportionately smaller for a large diameter (for example, approximately 1.5 to 2.0 m in diameter) turbofan engine than for a small diameter turbofan engine.

The fan tip diameter, measured across a centreline of the engine and between an outermost tip of opposing fan blades at their leading edge, may be in the range from 95 cm to 200 cm, for example in the range from 110 cm to 150 cm, or alternatively in the range from 155 cm to 200 cm. The fan tip diameter may be greater than any of: 110 cm, 115 cm, 120 cm, 125 cm, 130 cm, 135 cm, 140 cm, 145 cm, 150 cm, 155 cm, 160 cm, 165 cm, 170 cm, 175 cm, 180 cm, 185 cm, 190 cm or 195 cm. The fan tip diameter may be around 110 cm, 115 cm, 120 cm, 125 cm, 130 cm, 135 cm, 140 cm, 145 cm, 150 cm, 155 cm, 160 cm, 165 cm, 170 cm, 175 cm, 180 cm, 185 cm, 190 cm or 195 cm. The fan tip diameter may be greater than 160 cm.

The fan tip diameter may be in the range from 95 cm to 150 cm, optionally in the range from 110 cm to 150 cm, optionally in the range of from 110 cm to 145 cm, and further optionally in the range from 120 cm to 140 cm.

The fan tip diameter may be in the range from 155 cm to 200 cm, optionally in the range from 160 cm to 200 cm, and further optionally in the range from 165 cm to 190 cm.

Optionally, the turbofan gas turbine engine further comprises an outer casing, the outer casing enclosing the sequential arrangement of fan assembly, compressor module, and turbine module, an annular bypass duct being defined between the outer casing and the sequential arrangement of compressor module and turbine module, a bypass ratio being defined as a ratio of a mass air flow rate through the bypass duct to a mass air flow rate through the sequential arrangement of compressor module and turbine module, and wherein the bypass ratio is less than 4.0.

A turbofan engine having a bypass ratio (BPR) of less than approximately 4.0 will have a generally smaller bypass duct (the annular duct surrounding the core gas turbine engine) than a turbofan engine having a BPR greater than approximately 4.0. For a turbofan engine with a BPR greater than, say, 4.0, the correspondingly larger bypass duct volume provides more scope for positioning a heat exchanger within the bypass duct than would be the case for a low BPR turbofan engine.

Optionally, the fan assembly has two or more fan stages, at least one of the fan stages comprising a plurality of fan blades defining the fan diameter $D_{FAN}$.

Providing the fan assembly with two or more fan stages enables the pressure ratio of the fan assembly to be increased without having to increase a fan diameter.

According to a further aspect of the present disclosure, there is provided an aircraft comprising a gas turbine engine according to the first aspect.

The advantages outlined above, and in particular the advantage of a shorter engine makes the engine assembly more compact and so more readily packaged in an aircraft body.

According to a further aspect of the present disclosure, there is provided a method of operating an aircraft comprising the turbofan gas turbine engine according to the first aspect, the method comprising taking off from a runway, wherein the maximum rotational speed of the turbine during take-off is in the range of from 16000 rpm to 25000 rpm.

According to a further aspect of the present disclosure, there is provided a turbofan gas turbine engine for an aircraft, the gas turbine engine comprising, in axial flow sequence, a fan assembly, a compressor module, and a turbine module, with a first electric machine being positioned downstream of the fan assembly and being rotationally connected to the turbine module, the fan assembly being in fluid communication with the compressor module by an intermediate duct;

the fan assembly comprises a highest pressure fan stage having a plurality of fan blades extending radially from a hub, the plurality of fan blades defining a fan diameter ($D_{FAN}$), each fan blade having a leading edge and a trailing edge, and the compressor module comprises a lowest pressure compressor stage having a row of rotor blades, with each of the rotor blades extending radially and having a leading edge and a trailing edge, and wherein an intermediate flow axis is defined joining a radially outer tip of a trailing edge of one of the plurality of fan blades of the highest pressure fan stage, and a radially outer tip of a leading edge of one of the plurality of rotor blades of the lowest-pressure compressor stage, the intermediate flow axis lies in a longitudinal plane containing the centreline of the gas turbine engine, an intermediate flow axis angle is defined as the angle between the intermediate flow axis and the centreline, and the intermediate flow axis angle is in a range from −20 degrees to −30 degrees.

The highest pressure fan stage is the most axially rearward of the fan stages, where there are multiple fan stages, or simply the fan stage if there is a single fan stage. In this context, axially rearward means towards the rear, or exhaust, of the engine.

Likewise, the lowest pressure compressor stage is the most axially forward of the compressor stages, where there are multiple compressor stages, or simply the compressor stage if there is a single compressor stage. In this context, axially forward means towards the front, or intake, of the engine.

Selection of the intermediate flow axis angle to be in a range from −20 degrees to −30 degrees results in a gas turbine engine in which the angle subtended between the outer diameter of the highest pressure fan stage to the outer diameter of the lowest-pressure compressor stage is larger than for conventional engines.

In other words, a line joining the outer diameter of the highest pressure fan stage to the outer diameter of the lowest-pressure compressor stage extends radially inwardly more steeply than in conventional engines. This in turn results in an increased available volume in the space radially inward of the intermediate duct into which may be accommodated the first electric machine.

Optionally, the intermediate flow axis angle is in a range between −22 degrees and −26 degrees.

Optionally, the intermediate duct comprises a radially outer wall and a radially inner wall, and a radially inwardly facing surface of the radially outer wall has an outer wall angle in a range from −24 degrees to −34 degrees.

Selection of the outer wall angle of the intermediate duct to be in a range from −24 degrees to −34 degrees results in an intermediate duct that transitions radially inwardly from an exit plane of the fan to an inlet plane of the compressor more steeply than a conventional engine design. This in turn results in an increased available volume in the space radially inward of the intermediate duct into which may be accommodated the first electric machine.

According to a further aspect of the present disclosure, there is provided a turbofan gas turbine engine for an aircraft, the gas turbine engine comprising, in axial flow sequence, a fan assembly, a compressor module, and a turbine module, with a first electric machine being positioned downstream of the fan assembly and being rotationally connected to the turbine module, the fan assembly comprises a highest pressure fan stage having a plurality of fan blades extending radially from a hub and defining a fan diameter $D_{FAN}$, the fan module being rotationally connected to the turbine module by a first shaft, the first shaft being supported by a first bearing assembly and a second bearing assembly, the first bearing assembly being positioned axially forward of the second bearing assembly, and wherein the first bearing assembly is positioned axially between the fan assembly and the first electric machine, and at least a highest-pressure fan stage extends axially over the first bearing assembly.

In one arrangement of the gas turbine engine, the first bearing assembly is positioned axially such that the highest-pressure fan stage extends axially at least partially over the first bearing assembly. In other words, the first bearing assembly is positioned axially further forward than in prior art arrangements.

Moving the first bearing assembly axially forwards provides an increased volume of space into which can be accommodated the first electric machine without significantly extending the axial length of the gas turbine engine. This makes the gas turbine engine of the present disclosure more compact than a conventional equivalent.

Optionally, the highest-pressure fan stage extends axially completely over the first bearing assembly.

Moving the first bearing assembly forwards (in an upstream direction) to an axial position that is completely enclosed by the highest-pressure fan stage further increases the available volume between the fan assembly and the compressor assembly to accommodate the first electric machine.

Optionally, the turbine module extends axially over the second bearing assembly.

In a further alternative arrangement, the turbine module extends axially rearwards (in a downstream direction) such that the turbine module extends axially over at least part of the second bearing assembly.

Such a configuration enables the axial length of the gas turbine engine to be reduced making the engine more compact and hence easier for a user to install in a machine body.

Alternatively, the second bearing assembly may be positioned axially so as to be completely within the turbine assembly.

In the present disclosure, the gas turbine engine has a longitudinal axis being the rotational axis of the compressor and turbine assemblies. The gas turbine engine has a first side and a second side defined as opposing sides of the rotational axis in a direction extending from an exhaust face of the gas turbine engine to an inlet face of the gas turbine engine. The first side of the gas turbine engine corresponds to a left side of the gas turbine engine when looking from the rear of the engine towards the front of the engine. Likewise, the second side of the gas turbine engine corresponds to a right side of the gas turbine engine when looking from the rear of the engine towards the front of the engine.

An axial direction is defined as being in the direction of the axis of rotation of the gas turbine engine. A lateral direction is defined as being perpendicular to the axis of rotation of the gas turbine engine and as extending in the direction of the left and right sides of the gas turbine engine. A vertical direction is defined as being perpendicular to the axis of rotation of the gas turbine engine and also perpendicular to the lateral direction of the gas turbine engine.

According to a further aspect of the present disclosure, there is provided a gas turbine engine, the gas turbine engine comprising, in axial flow sequence, a fan assembly, a compressor module, a turbine module, and an exhaust module, the gas turbine engine comprising a first engine mount plane and a second engine mount plane, the first and second engine mount planes being configured to support the gas turbine engine in a machine body, the gas turbine engine having an axial length L, the axial length extending from an inlet face of the engine to an exhaust face of the engine, and wherein the first engine mount plane is positioned axially along the gas turbine engine at a first engine mount plane position, the first engine mount plane position being within a range of between 0.24*L to 0.32*L from the inlet face of the engine, and the second engine mount plane is positioned axially along the gas turbine engine at a second engine mount plane position, the second engine mount plane position being within a range of between 0.73*L to 0.79*L from the inlet face of the engine.

In some installations, it may be desirable to insert the gas turbine engine axially from a rear face or end of the machine body into which it is to be accommodated. It is also desirable for the gas turbine engine to be fully assembled with all of its ancillary components before it is installed into the aircraft. This makes the installation of the engine into the aircraft quicker and simpler for a user.

For example, the front portion of the machine body often comprises crew accommodation and aircraft control equipment that may be difficult and inconvenient to remove for engine installation access. Consequently, installing the engine from a rear face of the aircraft may simplify the installation process for a user.

Providing the gas turbine engine with a first engine mount plane part-way along the length of the engine, and a second engine mount plane at a rear portion of the engine, makes the process of installing the engine into the machine body easier and more convenient for a user.

Optionally, the gas turbine engine comprises in axial flow sequence, a heat exchanger module, a fan assembly, a compressor module, a turbine module, and an exhaust module, and the heat exchanger module is in fluid communication with the fan assembly by an inlet duct.

In one embodiment, the gas turbine engine includes a heat exchanger module positioned in the inlet duct upstream of the inlet face of the engine. This configuration further increases an axial length of the engine and in turn makes the axial insertion of the engine into the aircraft a more convenient and desirable option for a user.

Optionally, the first engine mount assembly position is within a range of between 0.28*L to 0.36*L from the inlet face of the engine.

Optionally, the second engine mount assembly position is within a range of between 0.83*L to 0.89*L from the inlet face of the engine.

Optionally, the gas turbine engine is a turbofan gas turbine engine.

Optionally, the gas turbine engine further comprises, at the first engine mount plane position, a mounting frame connected to both a first side and a second side of the engine, the mounting frame providing restraint to the engine mount assembly in both the vertical direction and the lateral direction.

Optionally the gas turbine engine further comprises, at the second engine mount plane position, a first side engine mount point, a centre engine mount point, and a second side engine mount point, the first side engine mount point providing restraint to the engine in the vertical direction, the centre engine mount point providing restraint to the engine in both the lateral direction and the axial direction, and the second side engine mount point providing restraint to the engine in the vertical direction.

Optionally, the gas turbine engine further comprises, at the first engine mount plane position, a second side engine mount point, the second side engine mount point providing restraint to the engine in both the vertical direction and in the lateral direction.

Optionally, the gas turbine engine further comprises, at the first engine mount plane position, a second side engine mount point, and a centre engine mount point, the second side engine mount point providing restraint to the engine in the lateral direction, and the centre engine mount point providing restraint to the engine in the vertical direction.

Optionally, the gas turbine engine further comprises, at the second engine mount plane position, a first side engine mount point, and a second side engine mount point, the first side engine mount point providing restraint to the engine in the vertical direction, and the second side engine mount point providing restraint to the engine in the vertical direction and in the lateral direction and in the axial direction.

Optionally, the gas turbine engine further comprises, at the second engine mount plane position, a first side engine mount point, and a second side engine mount point, the first side engine mount point providing restraint to the engine in both the vertical direction and the axial direction, and the second side engine mount point providing restraint to the engine in both the vertical direction and in the axial direction.

Optionally, the gas turbine engine further comprises, at the first engine mount plane position, a first side engine mount point, and a second side engine mount point, the first side engine mount point providing restraint to the engine in the vertical direction, and the second side engine mount point providing restraint to the engine in the vertical direction.

Optionally, the gas turbine engine further comprises, at the second engine mount plane position, a first side engine mount point, and a second side engine mount point, the first side engine mount point providing restraint to the engine in the axial direction, and the second side engine mount point providing restraint to the engine in the vertical direction, in the lateral direction and in the axial direction.

Optionally, the gas turbine engine further comprises, at the second engine mount plane position, a first side engine mount point, a centre engine mount point, and a second side engine mount point, the first side engine mount point providing restraint to the engine in the axial direction, the centre engine mount point providing restraint to the engine in the vertical direction, and the second side engine mount point providing restraint to the engine in both the lateral direction and in the axial direction.

Optionally the gas turbine engine further comprises, at the first engine mount plane position, a second side engine mount point, the second side engine mount point providing restraint to the engine in the vertical direction.

Optionally the gas turbine engine further comprises, at the first engine mount plane position, a centre engine mount point, the centre engine mount point providing restraint to the engine in the vertical direction.

Optionally, the gas turbine engine further comprises, at the second engine mount plane position, a first side engine mount point, and a second side engine mount point, the first side engine mount point providing restraint to the engine in both the vertical direction and the axial direction, and the second side engine mount point providing restraint to the engine in the vertical direction, in the lateral direction and in the axial direction.

Optionally, the gas turbine engine further comprises, at the first engine mount plane position, a first side engine mount point, and a second side engine mount point, the first side engine mount point providing restraint to the engine in the vertical direction, and the second side engine mount point providing restraint to the engine in both the vertical direction and the lateral direction.

Optionally the gas turbine engine further comprises, at the second engine mount plane position, a second side engine mount point, the second side engine mount point providing restraint to the engine in the vertical direction, in the lateral direction and in the axial direction.

Optionally, the gas turbine engine further comprises, at the second engine mount plane position, a centre engine mount point, and a second side engine mount point, the centre engine mount point providing restraint to the engine in the vertical direction, and the second side engine mount point providing restraint to the engine in both the lateral direction and in the axial direction.

According to a further aspect of the present disclosure, there is provided a cooling system for an aircraft, the cooling system comprising an apparatus, a heat exchanger, and a vapour cycle machine, wherein the apparatus comprises a first fluid being circulated to provide cooling to the apparatus, the heat exchanger being configured to transfer waste heat energy from the first fluid to a second fluid, the second fluid having a temperature $T_2$ (° C.), and the vapour cycle machine being configured to increase a temperature $T_1$ (° C.) of the first fluid, to a temperature greater than $T_2$ (° C.).

The vapour cycle machine increases the temperature of first fluid (representing 'low-grade' waste heat energy generated by the apparatus) to a temperature that is greater than that of a second fluid flowing through the heat exchanger. This enables the heat exchanger to transfer the waste heat energy from the first fluid to the second fluid.

Optionally, the vapour cycle machine is configured to increase a temperature $T_1$ (° C.) of the first fluid to a temperature greater than $(T_2+5)$ (° C.).

Increasing the temperature of the first fluid to a temperature that is at least 5° C. greater than that of the second fluid increases the efficiency of the heat energy transfer via the heat exchanger. This makes the cooling system more efficient and enables the cooling system to be reduced in size, weight and/or volume, thus making it more desirable for a user.

Optionally, the second fluid is an airflow passing through the heat exchanger.

The use of an airflow as the second fluid simplifies the structure and function of the cooling system.

Optionally, the vapour cycle machine comprises a working fluid selected from the group consisting of $CO_2$, HFCs (for example, r123a), or HFOs (for example r1234yf, r1234zd, or r1234ze).

In one arrangement of the vapour cycle machine, the working fluid is r1234ze. This is an environmentally friendly refrigerant fluid with properties similar to r134a.

Optionally, the apparatus is thermally connected to the heat exchanger by the first fluid passing along a thermal bus, a ratio of the temperature $T_1$ (° C.) of the first fluid, after passing through the vapour cycle machine, to a temperature $T_{IN}$ (° C.) of the airflow being in a range of between 1.5 to 3.5.

The selection of the lower limit for the ratio of the temperature of the first fluid, after passing through the vapour cycle machine, to a temperature of the airflow ensures that there is a sufficient temperature difference between the first fluid and the air flow to be able to effectively transfer waste heat energy from the first fluid to the air flow.

The upper limit for the ratio of the temperature of the first fluid, after passing through the vapour cycle machine, to a temperature of the airflow is selected to prevent the vapour cycle machine wasting energy by raising the temperature the first fluid to an unnecessarily high value.

According to a further aspect of the present disclosure, there is provided an aircraft comprising an engine, and a cooling system according to an earlier aspect.

The use of a cooling system according to the present disclosure in an aircraft enables a wide range of equipment or apparatus to be cooled in circumstances where the waste heat energy is generated at a temperature below which it can efficiently be rejected to the aircraft's heat exchanger(s).

Optionally, the second fluid is an engine fluid that is circulated through the engine.

Optionally, the second fluid is a fuel that is combusted within the engine.

By using an engine fluid such as, for example, engine oil or engine fuel, it becomes possible for the cooling system to reject waste heat energy generated by the apparatus to the engine fluid, despite the waste heat energy initially being at a temperature lower than that of the engine fluid.

This makes the cooling system of the disclosure more versatile than conventional heat exchanger arrangements, and hence more desirable for a user.

Optionally, the heat exchanger is in fluid communication with the engine by an inlet duct, and the second fluid is an inlet airflow passing through the heat exchanger prior to entry of the airflow into an inlet to the engine.

By utilising the inlet air, that is subsequently ingested by the engine, as the second fluid, it becomes possible to reject waste heat from ancillary equipment or apparatus to that incoming inlet air.

This enables the cooling system of the present disclosure to be simpler and more compact that conventional heat transfer arrangements, and thus more useful for a user when installing the cooling system in a machine body.

Optionally, the entire airflow entering the engine passes through the heat exchanger.

In one arrangement of the cooling system the entire flow of the second fluid (the airflow) that passes through the heat exchanger is then ingested by the engine as an engine intake air flow. This can simplify the cooling system because no additional cooling flows are required for the heat exchanger.

Optionally, the engine is a gas turbine engine comprising, a first electric machine, and a core engine, the core engine comprising, in axial flow sequence, a compressor module, a combustor module, and a turbine module, and the first electric machine is rotationally connected to the core engine.

The cooling system of the present disclosure can usefully be integrated with a gas turbine engine to cool ancillary systems (apparatus) without the need to provide additional cooling flows in order to dissipate waste heat energy.

According to a further aspect of the present disclosure, there is provided a method of operating a cooling system for an aircraft, the cooling system comprising an apparatus, a heat exchanger, and a vapour cycle machine, the method comprising the steps of:
  (i) circulating a first fluid to provide cooling to the apparatus;
  (ii) directing the first fluid through the vapour cycle machine to increase a temperature $T_1$ (° C.) of the first fluid to a temperature greater than $T_2$ (° C.); and
  (iii) directing the first fluid through the first heat exchanger to transfer waste heat energy from the first fluid having a temperature $T_1$ (° C.), to a second fluid having a temperature $T_2$ (° C.).

The vapour cycle machine increases the temperature of first fluid (representing 'low-grade' waste heat energy generated by the apparatus) to a temperature that is greater than that of a second fluid flowing through the heat exchanger. This enables the heat exchanger to transfer the waste heat energy from the first fluid to the second fluid.

Optionally, in step (iii) comprises the steps of:
  (ii)' directing an airflow through the first heat exchanger; and
  (iii) directing the first fluid through the first heat exchanger to transfer waste heat energy from the first fluid to the airflow.

The use of an airflow as the second fluid simplifies the structure and function of the cooling system.

According to a further aspect of the present disclosure, there is provided a method of operating an aircraft, the aircraft comprising an engine and a cooling system, the cooling system comprising an apparatus, a heat exchanger, and a vapour cycle machine, the method comprising the steps of:
  (i) circulating a first fluid to provide cooling to the apparatus;
  (ii) directing the first fluid through the vapour cycle machine to increase a temperature $T_1$ (° C.) of the first fluid to a temperature greater than $T_2$ (° C.);
  (iii) directing a flow of fuel to the engine via the first heat exchanger; and
  (iv) directing the first fluid through the first heat exchanger to transfer waste heat energy from the first fluid having a temperature $T_1$ (° C.), to the fuel having a temperature $T_2$ (° C.).

The vapour cycle machine increases the temperature of first fluid (representing 'low-grade' waste heat energy generated by the apparatus) to a temperature that is greater than that of the fuel supplied to the engine. This enables the heat exchanger to transfer the waste heat energy from the first fluid to the gas turbine engine's fuel.

According to a further aspect of the present disclosure, there is provided a gas turbine engine for an aircraft, the gas turbine engine comprising, in axial flow sequence, a compressor module, a combustor module, and a turbine module, and a first electric machine being rotationally connected to the turbine module, the first electric machine being configured to generate a total electrical power $P_{EM1}$ (W), and the gas turbine engine being configured to generate a total shaft power $P_{SHAFT}$ (W); and
  wherein, a ratio R of:

$$R = \frac{(\text{Total Electrical Power Generated} = P_{EM1})}{(\text{Total Shaft Power} = P_{SHAFT})}$$

is in a range of between 0.005 and 0.020.

The gas turbine engine of the present disclosure has an embedded electric machine that is capable of generating a level of electrical power that forms a higher proportion of the shaft power generated by the engine than in the case for any conventional gas turbine engine.

The first electric machine is connected directly to the HP (high-pressure) shaft connecting the high-pressure compressor to the high-pressure turbine. This enables the first electric machine to be used to start the gas turbine engine, which in turn allows the separate starter motor and associated drive mechanism to be deleted. This makes the gas turbine engine of the present disclosure simpler than conventional gas turbine engines.

Optionally, the gas turbine engine is a turbofan engine comprising, in axial flow sequence, a fan assembly, a compressor module, a combustor module, and a turbine module, Optionally, the gas turbine engine further comprises a second electric machine rotationally connected to the fan assembly, the second electric machine being configured to generate an electrical power $P_{EM2}$ (watts), and wherein, a ratio R of:

$$R = \frac{\text{(Total Electrical Power Generated} = P_{EM1} + P_{EM2})}{\text{(Total Shaft Power} = P_{SHAFT})}$$

is in a range of between 0.005 and 0.035.

The second electric machine being connected to the fan assembly is thus driven by the LP (low-pressure) shaft that connects the fan to the low-pressure turbine. The second electric machine therefore rotates at a lower rotational speed than the first electric machine that, as outlined above, is driven by the HP (high-pressure) shaft.

In the present arrangement, the second electric machine is rotationally coupled to the fan assembly and is positioned upstream of the fan.

In an alternative arrangement, the second electric machine may be positioned downstream of the low-pressure turbine while still being driven by the LP shaft. In this alternative arrangement, the second electric machine may be housed in a tail cone downstream of the exhaust assembly.

A further alternative arrangement involves the second electric machine being positioned radially outwardly of gas turbine engine with a drive arrangement extending out from the LP shaft.

Optionally, the first electric machine is positioned axially between the fan assembly and the compressor module.

By positioning the first electric machine axially between the fan assembly and the compressor module it can be directly driven from this HP shaft. This allows the volume occupied by the first electric machine to be minimised and so improves the space efficiency of the gas turbine engine.

Optionally, at least one of the first electric machine and the second electric machine, comprises an axial length $L_{EM}$ and a diameter $D_{EM}$, and a ratio of the axial length to the diameter ($L_{EM}/D_{EM}$) for the respective electric machine is in a range between 0.5 to 2.0.

The sizing of the length and diameter of the first electric machine or the second electric machine to produce a L/D ratio in the range of 0.5 to 2.0 enables the electric machine to have a high power density.

According to a further aspect of the present disclosure, there is provided a method of operating a gas turbine engine for an aircraft, the method comprising the steps of:

(i) providing a gas turbine engine, the gas turbine engine comprising, in axial flow sequence, a compressor module, a combustor module, and a turbine module;

(ii) providing a first electric machine positioned downstream of the fan assembly and rotationally connected to the turbine module; and (iii) operating the gas turbine engine at a full power condition in which the gas turbine engine generates a total shaft power $P_{SHAFT}$ (W), the first electric machine generates an electrical power $P_{EM1}$ (W), and wherein, a ratio R of:

$$R = \frac{\text{(Total Electrical Power Generated} = P_{EM1})}{\text{(Total Shaft Power} = P_{SHAFT})}$$

is in a range of between 0.005 and 0.020.

The gas turbine engine of the present disclosure has an embedded electric machine that is capable of generating a level of electrical power that forms a higher proportion of the shaft power generated by the engine than in the case for any conventional gas turbine engine.

Optionally, step (i) comprises the step of:

(i)' providing a turbofan gas turbine engine, the gas turbine engine comprising, in axial flow sequence, a fan assembly, a compressor module, a combustor module, and a turbine module.

Optionally, step (ii) comprises the additional step of:

(ii-a) providing a second electric machine rotationally connected to the fan assembly;

and step (iii) comprises the step of:

(iii)' operating the gas turbine engine at a full power condition in which the gas turbine engine generates a total shaft power $P_{SHAFT}$ (W), the first electric machine generates an electrical power $P_{EM1}$ (W), and the second electric machine generates an electrical power $P_{EM2}$ (W), wherein, a ratio R of:

$$R = \frac{\text{(Total Electrical Power Generated} = P_{EM1} + P_{EM2})}{\text{(Total Shaft Power} = P_{SHAFT})}$$

is in a range of between 0.005 and 0.035.

The second electric machine being connected to the fan assembly is thus driven by the LP (low-pressure) shaft that connects the fan to the low-pressure turbine. The second electric machine therefore rotates at a lower rotational speed than the first electric machine that, as outlined above, is driven by the HP (high-pressure) shaft.

In the present arrangement, the second electric machine is rotationally coupled to the fan assembly and is positioned upstream of the fan.

In an alternative arrangement, the second electric machine may be positioned downstream of the low-pressure turbine while still being driven by the LP shaft. In this alternative arrangement, the second electric machine may be housed in a tail cone downstream of the exhaust assembly.

A further alternative arrangement involves the second electric machine being positioned radially outwardly of gas turbine engine with a drive arrangement extending out from the LP shaft.

According to a further aspect of the present disclosure, there is provided a cooling system for an aircraft, the cooling system comprising a gas turbine engine, an ancillary apparatus, and a heat exchanger, the gas turbine engine comprising, in axial flow sequence, a compressor module, a combustor module, and a turbine module, and a first electric machine being rotationally connected to the turbine module, the first electric machine being configured to generate an electrical power $P_{EM1}$ (W), the heat exchanger being configured to transfer a total waste heat energy Q (W) generated by the gas turbine engine and the ancillary apparatus, to an airflow passing through the heat exchanger, and wherein, a ratio S of:

$$S = \frac{\text{(Total Electrical Power Generated} = P_{EM1})}{\text{(Total Heat Energy Rejected to Airflow} = Q)}$$

is in a range of between 0.50 and 5.00.

The gas turbine engine of the present disclosure has an embedded electric machine that is capable of generating a level of electrical power that is greater relative to the shaft power generated by the engine than for any conventional gas turbine engine.

In the context of the present disclosure, the gas turbine engine is considered to comprise at least the compressor module, the combustor module, the turbine module, and the exhaust module, together with the first electric machine. The ancillary apparatus is considered to comprise, for example, other equipment situated on the aircraft that generate heat energy and/or are required to operate at a specific temperature or range of temperatures.

Furthermore, the gas turbine engine and the ancillary apparatus together require to dissipate approximately between 70 kW and 300 kW of total waste heat energy to the intake airflow entering the gas turbine engine. This waste heat energy dissipation requirement is greater than for any conventional aircraft cooling system.

The cooling system of the present disclosure provides both a high electrical power generation capacity for the ancillary apparatus, together with a high waste heat energy rejection capacity for the engine and ancillary apparatus. This enables the cooling system of the present disclosure to provide the electrical generation and heat dissipation requirements for the aircraft and ancillary apparatus without the need for supplementary electrical power generation means or for separate waste heat energy dissipation means. Consequently, the cooling system of the present disclosure is simpler and easier to package into an aircraft, and more space and weight efficient in operation, making it more desirable for a user.

The first electric machine is also capable of operating in a motoring mode in which it can rotationally drive the turbine module. In this way the first electric machine can actively modify the rotational speed characteristic of the turbine module in response to a user-defined requirement. In other words, the first electric machine can be used, for example, to modify the working line of the gas turbine engine, or to adjust the surge margin at a particular operating point of the gas turbine engine.

An additional feature of the gas turbine engine of the present disclosure is the ability to restart the engine by using the first electric machine to rotate the turbine module. In this way, the engine may be restarted either while the aircraft is on the ground, for example before take-off, or in-flight, for example following an unscheduled engine stoppage.

Optionally, the gas turbine engine is a turbofan engine comprising, in axial flow sequence, a fan assembly, a compressor module, a combustor module, and a turbine module.

In one example, the gas turbine engine has a total electrical power generation capacity of 200 kW, while the heat exchanger positioned in the inlet flow to the engine is configured to dissipate a total waste heat energy load of 150 kW. This gives a value for the ratio $S_1$ of 1.33.

Optionally, the cooling system further comprises a second electric machine rotationally connected to the fan assembly, the second electrical machine being configured to generate an electrical power $P_{EM2}$ (watts), and wherein, a ratio S of:

$$S = \frac{\text{(Total Electrical Power Generated} = P_{EM1} + P_{EM2})}{\text{(Total Heat Energy Rejected to Airflow} = Q)}$$

is in a range of between 0.50 and 8.00.

The integration of a second electric machine into the cooling system further increases the electric power generation capability of the system.

The second electric machine can also operate in a motoring mode in which it can rotationally drive the fan assembly. This enables the second electric machine to actively modify the rotational speed characteristic of the fan assembly in response to a user-defined requirement. For example, such modification of the rotational speed characteristic of the fan assembly may be used to ameliorate or eliminate fan flutter.

Optionally, the first electric machine is positioned axially between the fan assembly and the compressor module.

By positioning the first electric machine axially between the fan assembly and the compressor module it can be directly driven from this HP shaft. This allows the volume occupied by the first electric machine to be minimised and so improves the space efficiency of the gas turbine engine.

According to a further aspect of the present disclosure, there is provided an aircraft comprising the cooling system according to an earlier aspect.

According to a further aspect of the present disclosure, there is provided a method of operating a cooling system for an aircraft, the method comprising the steps of:

(i) providing a gas turbine engine and an ancillary apparatus, the gas turbine engine comprising, in axial flow sequence, a compressor module, a combustor module, and a turbine module, and a first electric machine that is rotationally connected to the turbine module;

(ii) providing a heat exchanger that is capable of transferring a total waste heat energy Q (W) generated by the gas turbine engine and the ancillary apparatus, to an airflow passing through the heat exchanger;

(iii) operating the gas turbine engine at a full power condition in which the gas turbine engine generates a total waste heat energy quantity Q (W), and the first electric machine generates an electrical power $P_{EM1}$ (W), and wherein a ratio S of:

$$S = \frac{\text{(Total Electrical Power Generated} = P_{EM1})}{\text{(Total Heat Energy Rejected to Airflow} = Q)}$$

is in a range of between 0.50 and 5.00.

The gas turbine engine of the present disclosure has an embedded electric machine that is capable of generating a level of electrical power that forms a higher proportion of the shaft power generated by the engine than in the case for any conventional gas turbine engine.

Furthermore, the gas turbine engine and the ancillary apparatus together require to dissipate approximately between 70 kW and 300 kW of total waste heat energy to the intake airflow entering the gas turbine engine. This waste heat energy dissipation requirement is greater than for any conventional aircraft cooling system.

The cooling system of the present disclosure provides both a high electrical power generation capacity for the ancillary apparatus, together with a high waste heat energy rejection capacity for the engine and ancillary apparatus. This enables the cooling system of the present disclosure to provide the electrical generation and heat dissipation requirements for the aircraft and ancillary apparatus without the need for supplementary electrical power generation means or for separate waste heat energy dissipation means. Consequently, the cooling system of the present disclosure is simpler and easier to package into an aircraft, and more space and weight efficient in operation, making it more desirable for a user.

The first electric machine is also capable of operating in a motoring mode in which it can rotationally drive the turbine module. In this way the first electric machine can actively modify the rotational speed characteristic of the turbine module in response to a user-defined requirement. In other words, the first electric machine can be used, for example, to modify the working line of the gas turbine engine, or to adjust the surge margin at a particular operating point of the gas turbine engine.

Optionally, step (i) comprises the steps of:
(i)' providing a turbofan gas turbine engine and an ancillary apparatus, the turbofan gas turbine engine comprising, in axial flow sequence, a fan assembly, a compressor module, a combustor module, and a turbine module, and a first electric machine that is rotationally connected to the turbine module; and
(i-a)' providing a second electric machine rotationally connected to the fan assembly;
and step (iii) comprises the step of:
(iii)' operating the turbofan gas turbine engine at a full power condition in which the turbofan gas turbine engine generates a total waste heat energy quantity Q (W), the first electric machine generates an electrical power $P_{EM1}$ (W), the second electric machine generates an electrical power $P_{EM2}$ (W), and wherein, a ratio S of:

$$S = \frac{\text{(Total Electrical Power Generated} = P_{EM1} + P_{EM2})}{\text{(Total Heat Energy Rejected to Airflow} = Q)}$$

is in a range of between 0.50 and 8.00.

The integration of a second electric machine into the cooling system further increases the electric power generation capability of the system.

The second electric machine can also operate in a motoring mode in which it can rotationally drive the fan assembly. This enables the second electric machine to actively modify the rotational speed characteristic of the fan assembly in response to a user-defined requirement. For example, such modification of the rotational speed characteristic of the fan assembly may be used to ameliorate or eliminate fan flutter.

According to a further aspect of the present disclosure, there is provided a gas turbine engine for an aircraft, the gas turbine engine comprising, in axial flow sequence, a heat exchanger module, and a core engine, the core engine comprising, in axial flow sequence, an intermediate-pressure compressor, a high-pressure compressor, a high pressure turbine, and a low-pressure turbine, the high-pressure compressor being rotationally connected to the high-pressure turbine by a first shaft, the intermediate-pressure compressor being rotationally connected to the low-pressure turbine by a second shaft, the heat exchanger module being in fluid communication with the core engine by an inlet duct, the heat exchanger module comprising a central hub and a plurality of heat transfer elements extending radially outwardly from the central hub and spaced in a circumferential array, for transfer of heat energy from a first fluid contained within the heat transfer elements to an inlet airflow passing over a surface of the heat transfer elements prior to entry of the airflow into an inlet to the core engine, and wherein the gas turbine engine further comprises a first electric machine and a second electric machine, the first electric machine is rotationally connected to the first shaft, the first electric machine is positioned downstream of the heat exchanger module, and the second electric machine is rotationally connected to the second shaft.

The gas turbine engine of the present disclosure includes integrated electric power generation from the first and second electric machines, together with the capability to reject waste heat energy into the inlet air entering the gas turbine engine. This provides a user with an integrated power system that can be simply installed into an aircraft machine body without the need for additional electrical power generation or heat dissipation capability. This makes the gas turbine engine more convenient and both more space-efficient and weight-efficient than prior art arrangements that provide the same functionality.

Optionally, the second electric machine is accommodated within the central hub.

The central hub is required for aerodynamic reasons to smooth an inlet airflow into the compressor module. The central hub also provides mounting points for the radially innermost ends of the heat transfer elements. The interior volume of the central hub is therefore likely to be substantially unused.

Positioning the second electric machine within the central hub of the heat exchanger module therefore efficiently uses the interior volume of the central hub. This location also allows the second electric machine to be simply rotationally driven from an upstream end of the second shaft.

Optionally, the second electric machine is positioned axially downstream of the low-pressure turbine.

In an alternative arrangement, the second electric machine is positioned in a tail cone of the core engine. In this arrangement, the second electric machine is rotationally driven by a downstream end of the second shaft. In the same manner as outlined above for the central hub, the tail cone volume is generally unused.

Consequently, the second electric machine may be located in tail cone with little space conflict to other engine components. Furthermore, being positioned directly downstream of the low-pressure turbine assembly, the second electric machine may easily be rotationally connected to and driven by the second shaft.

Optionally, the first electric machine is positioned axially upstream of the core engine.

Positioning the first electric machine axially upstream of the core engine means that the outer diameter of the core engine does not have to be increased to enclose the first electric machine. Thus, the dimensions of the core engine can be substantially unchanged by the addition of the first electric machine.

Optionally, the gas turbine engine further comprises an electrical energy storage unit, and the electrical energy storage unit is configured to store electrical energy that may be generated by at least one of the first electric machine and the second electric machine.

The electrical energy storage unit enables electrical energy generated by either or both of the first and second electric machines to be stored in readiness for future use. For example, this stored electrical energy can be used to power either or both of the first and second electric machines in order to modify the operating characteristics of the gas turbine engine.

Alternatively, the stored electrical energy could be used to drive the first electric machine in order to start the gas turbine engine. This starting process may include both ground engine starting and in-flight engine starting.

Optionally, the electrical energy storage unit is a battery.

In one arrangement, the electrical energy storage unit is battery.

Optionally, the electrical energy storage unit is a capacitor.

Using a capacitor as the electrical energy storage unit provides for a higher charge and discharge rate than, for example, a conventional lithium battery. However, a capacitor storage unit may be more expensive and more difficult to package than a conventional battery.

Optionally, the gas turbine engine further comprises a fan assembly, the fan assembly being rotationally connected to the second shaft, Optionally, the second electric machine is rotationally connected to the fan assembly.

The use of a second electric machine that is rotationally connected to the fan assembly further increases the electric power generation capability of the system.

The second electric machine can also operate in a motoring mode in which it can rotationally drive the fan assembly. This enables the second electric machine to actively modify the rotational speed characteristic of the fan assembly in response to a user-defined requirement. For example, such modification of the rotational speed characteristic of the fan assembly may be used to ameliorate or eliminate fan flutter.

According to a further aspect of the present disclosure, there is provided a gas turbine engine for an aircraft, the gas turbine engine comprising, in axial flow sequence, a compressor module, a combustor module, and a turbine module, and further comprising a first electric machine rotationally connected to the turbine module, the combustor module has a combustor volume V (m³), wherein, in use, at a full power condition, the gas turbine engine has a maximum corrected core mass flow Q (kg/sec), and a ratio T of:

$$T = \frac{\text{(Maximum Corrected Core Mass Flow} = Q)}{\text{(Combustor volume} = V)}$$

is in a range of between 250 and 2,200.

The full power condition is considered to be maximum dry thrust operation at Sea Level Static (SLS) conditions in International Standard Atmospheric conditions (1,013.25 mb/15° C.).

The first electric machine is rotationally connected to the HP (high-pressure) turbine module. The first electric machine is thus driven by the HP shaft during normal operation of the gas turbine engine.

Being connected to the HP shaft enables the first electric machine to be used to start the gas turbine engine. This in turn enables the conventional separate starter motor and associated drive mechanism to be deleted.

In addition to ground starting of the gas turbine engine, the first electric machine can be used for in-flight restarting of the gas turbine engine.

Such an in-flight engine restart is sometimes termed a "windmill relight", because the airflow across the engine propulsor is used to rotate the engine to a rotational speed that is sufficient to restart the engine. However, in order for a gas turbine engine to be capable of in-flight "windmill relighting", the combustor volume must be greater than that required for normal operation of the engine.

Consequently, by eliminating the requirement for the gas turbine engine to be capable of "windmill relighting" it becomes possible to reduce the combustor volume to that required only for normal operation of the engine. Thus, the gas turbine engine of the present disclosure can be lighter and small in volume than a conventional engine that is required to be capable of "windmill relighting".

Optionally, in use, at a full power condition, the first electric machine is configured to generate an electrical power $P_{EM}$ (W), and wherein a ratio V of:

$$V = \frac{\text{(Total Electrical Power Generated} = P_{EM})}{\text{(Combustor volume} = V)}$$

is in a range of between $2.5 \times 10^6$ and $25.0 \times 10^6$.

The gas turbine engine of the present disclosure has an embedded electric machine that is capable of generating a level of electrical power that is greater relative to the shaft power generated by the engine than for any conventional gas turbine engine.

The first electric machine is also capable of operating in a motoring mode in which it can rotationally drive the turbine module. In this way the first electric machine can actively modify the rotational speed characteristic of the turbine module in response to a user-defined requirement. In other words, the first electric machine can be used, for example, to modify the working line of the gas turbine engine, or to adjust the surge margin at a particular operating point of the gas turbine engine.

An additional feature of the gas turbine engine of the present disclosure is the ability to restart the engine by using the first electric machine to rotate the turbine module. In this way, the engine may be restarted either while the aircraft is on the ground, for example before take-off, or in-flight, for example following an unscheduled engine stoppage.

Optionally, the gas turbine engine is a turbofan engine comprising, in axial flow sequence, a fan assembly, a compressor module, a combustor module, and a turbine module, Optionally, in use, the maximum dry thrust produced by the engine is in the range of between 30 kN and 170 kN.

In one arrangement of the present disclosure, the aircraft is a small passenger carrying aircraft having between, for example, 6 and 20 seats. The aircraft may have a single turbofan engine integrally mounted in the aircraft's fuselage or alternatively, may have two engines attached to the fuselage, for example in tail-mounted nacelles.

Optionally, in use, the maximum dry thrust produced by the engine is in the range of between 170 kN and 500 kN.

In another arrangement of the disclosure, the aircraft is a passenger aircraft having between 15 and 40 seats. In this arrangement, the aircraft may have two turbofan engines mounted on the wings, for example in underwing nacelles.

According to a further aspect of the present disclosure, there is provided a method of operating a gas turbine engine for an aircraft, the gas turbine engine comprising, in axial flow sequence, a compressor module, a combustor module, and a turbine module;

wherein the method comprises the steps of:
(i) providing, in axial flow sequence, a compressor module, a combustor module, and a turbine module;
(ii) sizing the combustor module to have a combustor volume V (cm³); and
(iii) operating the gas turbine engine at a full power condition in which the gas turbine engine has a maximum corrected core mass flow Q (kg/sec), and a ratio T of:

$$T = \frac{\text{(Maximum Corrected Core Mass Flow} - Q)}{\text{(Combustor volume} - V)}$$

is in a range of between 250 and 2,200.

The first electric machine is rotationally connected to the HP (high-pressure) turbine module. The first electric machine is thus driven by the HP shaft during normal operation of the gas turbine engine.

Being connected to the HP shaft enables the first electric machine to be used to start the gas turbine engine. This in turn enables the conventional separate starter motor and associated drive mechanism to be deleted.

In addition to ground starting of the gas turbine engine, the first electric machine can be used for in-flight restarting of the gas turbine engine.

Such an in-flight engine restart is sometimes termed a "windmill relight", because the airflow across the engine propulsor is used to rotate the engine to a rotational speed that is sufficient to restart the engine. However, in order for a gas turbine engine to be capable of in-flight "windmill relighting", the combustor volume must be greater than that required for normal operation of the engine.

Consequently, by eliminating the requirement for the gas turbine engine to be capable of "windmill relighting" it becomes possible to reduce the combustor volume to that required only for normal operation of the engine. Thus, the gas turbine engine of the present disclosure can be lighter and small in volume than a conventional engine that is required to be capable of "windmill relighting".

Optionally, step (iii) comprises the step of:
(iii) operating the gas turbine engine at a full power condition in which the gas turbine engine has a maximum corrected core mass flow Q (kg/sec), a ratio of:

$$T = \frac{\text{(Maximum Corrected Core Mass Flow} - Q)}{\text{(Combustor volume} - V)}$$

is in a range of between 250 and 2,200;
the first electric machine generates an electrical power $P_{EM}$ (W), and a ratio of:

$$V = \frac{\text{(Total Electrical Power Generated} = P_{EM})}{\text{(Combustor volume} = V)}$$

is in a range of between $2.5 \times 10^6$ and $25.0 \times 10^6$.

The gas turbine engine of the present disclosure has an embedded electric machine that is capable of generating a level of electrical power that is greater relative to the shaft power generated by the engine than for any conventional gas turbine engine.

The first electric machine is also capable of operating in a motoring mode in which it can rotationally drive the turbine module. In this way the first electric machine can actively modify the rotational speed characteristic of the turbine module in response to a user-defined requirement. In other words, the first electric machine can be used, for example, to modify the working line of the gas turbine engine, or to adjust the surge margin at a particular operating point of the gas turbine engine.

An additional feature of the gas turbine engine of the present disclosure is the ability to restart the engine by using the first electric machine to rotate the turbine module. In this way, the engine may be restarted either while the aircraft is on the ground, for example before take-off, or in-flight, for example following an unscheduled engine stoppage.

Optionally, the gas turbine engine is a turbofan gas turbine engine, and step (i) comprises the steps of:
(i)' providing, in axial flow sequence, a fan assembly, a compressor module, a combustor module, and a turbine module.

The skilled person will appreciate that a feature described above in relation to any one of the aspects may be applied, mutatis mutandis, to any other aspect of the invention. For example, in various embodiments any two or more of the conditions for ratios as defined above, and optionally all specified ratio ranges, may apply to any given aspect or embodiment. All aspects may apply to an engine of some embodiments. Furthermore, any feature described below may apply to any aspect and/or may apply in combination with any one of the claims.

As noted elsewhere herein, the present disclosure may relate to a turbofan gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core. The fan may comprise any number of stages, for example multiple stages. Each fan stage may comprise a row of fan blades and a row of stator vanes. The stator vanes may be variable stator vanes (in that their angle of incidence may be variable).

The turbofan gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

In any turbofan gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of compressor stages, for example multiple stages. Each compressor stage may comprise a row of rotor blades and a row of stator vanes. The stator vanes may be variable stator vanes (in that their angle of incidence may be variable). The row of rotor blades and the row of stator vanes may be axially offset from each other.

The or each turbine (for example the first turbine and second turbine as described above) may comprise any number of turbine stages, for example multiple stages. Each turbine stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.40, 0.39, 0.38, 0.37, 0.36, 0.35, 0.34, 0.33, 0.32, 0.31, 0.30, 0.29, 0.28, 0.27 or 0.26. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The diameter of the fan may be measured across the engine centreline and between the tips of opposing fan blades at their leading edge. The fan diameter may be greater than (or on the order of) any of: 50 cm, 60 cm, 70 cm (around 27.5 inches), 80 cm (around 31.5 inches), 90 cm, 100 cm (around 39 inches), 110 cm (around 43 inches), 120 cm (around 47 inches), 130 cm (around 51 inches), 140 cm (around 55 inches), 150 cm (around 59 inches), or 160 cm (around 63 inches). The fan diameter may be in an inclusive range bounded by any two of the values in the previous sentence (i.e. the values may form upper or lower bounds), for example in the range of from 50 cm to 70 cm or 90 cm to 130 cm.

The fan face area may be calculated as $\pi$ multiplied by the square of the fan tip radius.

The rotational speed of the fan may vary in use. Generally, the rotational speed is lower for fans with a higher diameter. Purely by way of non-limitative example, the rotational speed of the fan at cruise conditions may be less than 10000 rpm, for example less than 9000 rpm. Purely by way of further non-limitative example, the rotational speed of the fan at cruise conditions for an engine having a fan diameter in the range of from 50 cm to 90 cm (for example 60 cm to 80 cm or 65 cm to 75 cm) may be in the range of from 7000 rpm to 22000 rpm, for example in the range of from 7000 rpm to 16000 rpm, for example in the range of from 7500 rpm to 14000 rpm. Purely by way of further non-limitative example, the rotational speed of the fan at cruise conditions for an engine having a fan diameter in the range of from 90 cm to 150 cm may be in the range of from 4500 rpm to 12500 rpm, for example in the range of from 4500 rpm to 10000 rpm, for example in the range of from 6000 rpm to 10000 rpm.

In use of the turbofan gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.22, 0.23, 0.24, 0.25, 0.26, 0.27, 0.28, 0.29, 0.30, 0.31, 0.32, 0.33, 0.34, 0.35, 0.36, 0.37, 0.38, 0.39 or 0.40 (all values being dimensionless). The fan tip loading may be in an inclusive range bounded by any two of the values in the previous sentence (i.e. the values may form upper or lower bounds), for example in the range of from 0.28 to 0.31, or 0.29 to 0.30.

Turbofan gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 0.4, 0.5, 0.6, 0.7, 0.8, 0.9, 1.0, 1.1, 1.2, 1.3, 1.4, 1.5, 1.6, 1.7, 1.8, 1.9, 2.0, 2.4, 2.8, 3.2, 3.6, or 4.0. The bypass ratio may be in an inclusive range bounded by any two of the values in the previous sentence (i.e. the values may form upper or lower bounds), for example in the range of form of 0.4 to 1.0, 0.5 to 0.9, or 0.6 to 0.9. Alternatively, the bypass ratio may be in a bounded range in the form of 1.0 to 4.0, 1.8 to 3.6, or 2.4 to 3.6. The bypass duct may be substantially annular. The bypass duct may be radially outside the core engine. The radially outer surface of the bypass duct may be defined by a nacelle and/or a fan case.

The overall pressure ratio of a turbofan gas turbine engine as described and/or claimed herein may be defined as the ratio of the stagnation pressure upstream of the fan to the stagnation pressure at the exit of the highest-pressure compressor (before entry into the combustor). By way of non-limitative example, the overall pressure ratio of a gas turbine engine as described and/or claimed herein at cruise may be greater than (or on the order of) any of the following: 10, 15, 20, 25, 30, 35 or 40. The overall pressure ratio may be in an inclusive range bounded by any two of the values in the previous sentence (i.e. the values may form upper or lower bounds), for example in the range of from 20 to 35.

Specific thrust of a turbofan gas turbine engine may be defined as the net thrust of the engine divided by the total mass flow through the engine. At cruise conditions, the specific thrust of an engine as described and/or claimed herein may be less than (or on the order of) any of the following: 800 Nkg$^{-1}$s, 850 Nkg$^{-1}$s, 900 Nkg$^{-1}$s, 950 Nkg$^{-1}$s, 1000 Nkg$^{-1}$s, 1050 Nkg$^{-1}$s, 1100 Nkg$^{-1}$s, 1150 Nkg$^{-1}$s, 1200 Nkg$^{-1}$s, 1250 Nkg$^{-1}$s, 1300 Nkg$^{-1}$s, 1350 Nkg$^{-1}$s, or 1400 Nkg$^{-1}$s. The specific thrust may be in an inclusive range bounded by any two of the values in the previous sentence (i.e. the values may form upper or lower bounds), for example in the range of from 800 Nkg$^{-1}$s to 950 Nkg$^{-1}$s, or 900 Nkg$^{-1}$s to 1350 Nkg$^{-1}$s. Such engines may be particularly efficient in comparison with conventional gas turbine engines.

A turbofan gas turbine engine as described and/or claimed herein may have any desired maximum thrust. Purely by way of non-limitative example, a gas turbine as described and/or claimed herein may be capable of producing a maximum thrust of at least (or on the order of) any of the following: 20 kN, 40 kN, 60 kN, 80 kN, 100 kN, 120 kN, 140 kN, 160 kN, 180 kN, or 200 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 60 kN to 160 kN, for example 70 kN to 120 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high-pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1500K, 1550K, 1600K, 1650K, 1700K, 1750K, 1800K, 1850K, 1900K, 1950K, or 2000K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K, 2000K, 2050K, 2100K, 2150K, 2200K, 2250K or 2300K. The maximum TET may be in an inclusive range bounded by any two of the values in the previous sentence (i.e. the values may form upper or lower bounds), for example in the range of from 1800K to 2200K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium-based metal or an aluminium-based material (such as an aluminium-lithium alloy) or a steel-based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The turbofan gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan stage of a turbofan gas turbine engine as described and/or claimed herein may have any desired number of fan blades, for example 12, 14, 16, 18, 20, 22, 24, 26, 28, 30, 32, or 34 fan blades.

As used herein, cruise conditions have the conventional meaning and would be readily understood by the skilled person. In this regard, cruise conditions encompass both subsonic cruise conditions and supersonic cruise conditions. Thus, for a given turbofan gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given turbofan gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the subsonic cruise condition may be any point in the range of from Mach 0.80 to 0.99, for example 0.80 to 0.85, for example 0.85 to 0.90, for example 0.90 to 0.95, for example 0.95 to 0.99, for example in the region of Mach 0.80, in the region of Mach 0.85 or in the range of from 0.80 to 0.85. Any single speed within these ranges may be part of the cruise condition. For some aircraft, the cruise conditions may be outside these ranges, for example below Mach 0.80.

Purely by way of example, the subsonic cruise conditions may correspond to standard atmospheric conditions (according to the International Standard Atmosphere, ISA) at an altitude that is in the range of from 7000 m to 17000 m, for example in the range of from 10000 m to 16000 m, for example in the range of from 11000 m to 15000 m (around 50000 ft), for example in the range of from 12500 m to 15000 m, for example in the region of 15000 m. The cruise conditions may correspond to standard atmospheric conditions at any given altitude in these ranges.

Purely by way of example, the forward speed at the supersonic cruise condition may be any point in the range of from Mach 1.20 to 2.20, for example 1.35 to 2.10, for example 1.50 to 2.05, for example in the region of Mach 2.00 or in the range of from 1.80 to 2.00. Any single speed within these ranges may be part of the cruise condition. For some aircraft, the cruise conditions may be outside these ranges, for example between Mach 1.0 and 1.20, or above Mach 2.20.

Purely by way of example, the supersonic cruise conditions may correspond to standard atmospheric conditions (according to the International Standard Atmosphere, ISA) at an altitude that is in the range of from 11000 m to 19000 m, for example in the range of from 12500 m to 17000 m, for example in the range of from 15000 m to 17000 m (around 56000 ft), for example in the range of from 16000 m to 17000 m, for example in the region of 17000 m. The cruise conditions may correspond to standard atmospheric conditions at any given altitude in these ranges.

Purely by way of example, the subsonic cruise conditions may correspond to an operating point of the engine that provides a known required thrust level (for example a value in the range of from 40 kN to 65 kN) at a forward Mach number of 0.8 and standard atmospheric conditions (according to the International Standard Atmosphere) at an altitude of 38000 ft (11582 m). Purely by way of further example, the supersonic cruise conditions may correspond to an operating point of the engine that provides a known required thrust level (for example a value in the range of from 70 kN to 120 kN) at a forward Mach number of 1.50 and standard atmospheric conditions (according to the International Standard Atmosphere) at an altitude of 56000 ft (17000 m).

In use, a turbofan gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect of the disclosure, there is provided an aircraft comprising a turbofan gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect of the disclosure, there is provided a method of operating a turbofan gas turbine engine as described and/or claimed herein. The operation may be at the cruise conditions as defined elsewhere herein (for example in terms of the thrust, atmospheric conditions and Mach Number).

According to an aspect of the disclosure, there is provided a method of operating an aircraft comprising a turbofan gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which:

FIG. 12 shows a schematic view of the front and rear engine mount planes of a further embodiment of the disclosure;

FIG. 13 shows a schematic view of the front and rear engine mount planes of a further embodiment of the disclosure;

FIG. 14 shows a schematic view of the front and rear engine mount planes of a further embodiment of the disclosure;

FIG. 15 shows a schematic view of the front and rear engine mount planes of a further embodiment of the disclosure;

FIG. 16 shows a schematic view of the front and rear engine mount planes of a further embodiment of the disclosure;

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
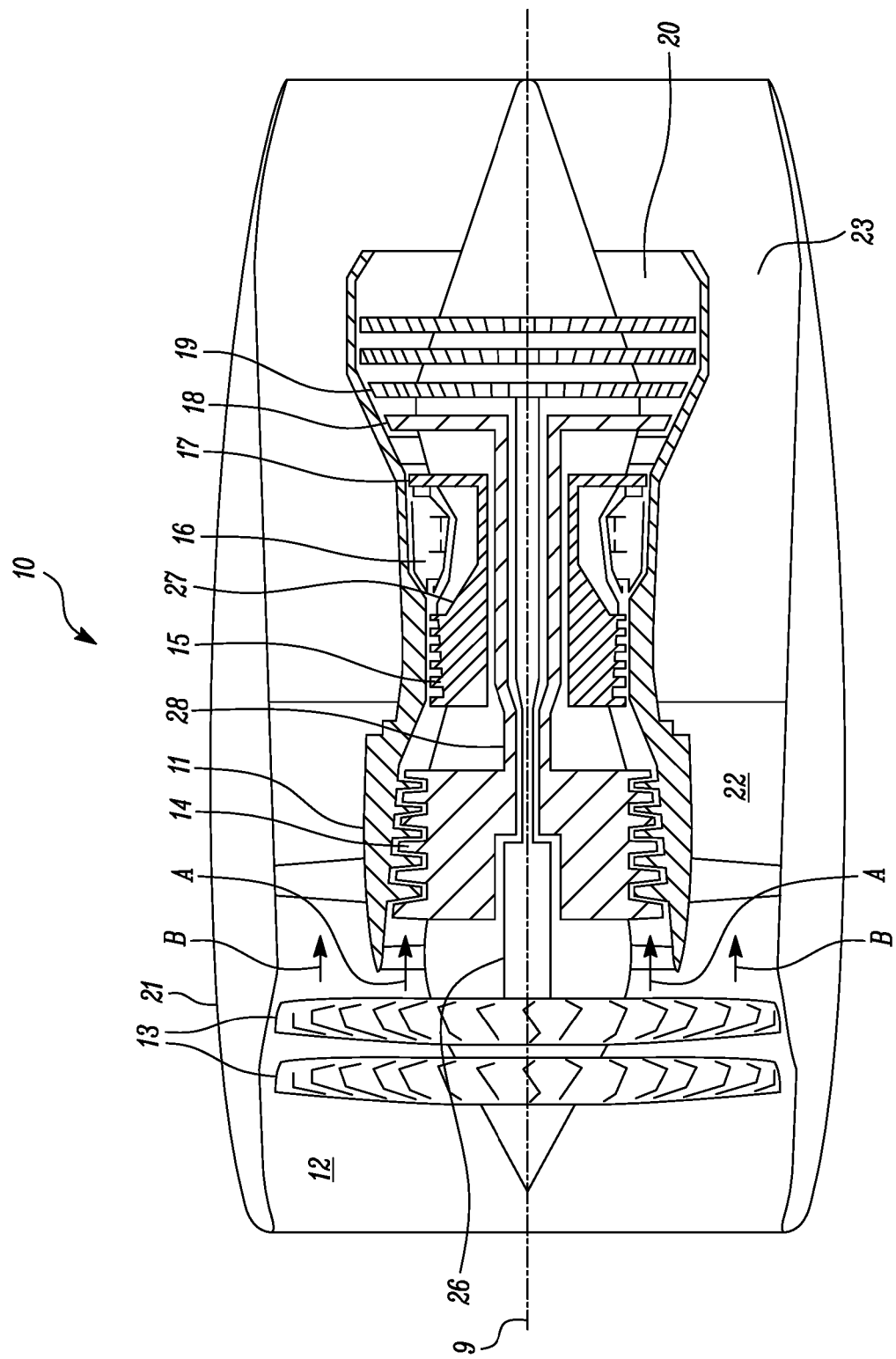
FIG. 1 shows a schematic part-sectional view of a turbofan gas turbine engine according to the prior art.

FIG. 1 illustrates a conventional turbofan gas turbine engine 10 having a principal rotational axis 9. The engine 10 comprises an air intake 12 and a two-stage propulsive fan 13 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, combustion equipment 16, a high-pressure turbine 17, an intermediate-pressure turbine 18, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 13 is attached to and driven by the low-pressure turbine 19 via a shaft 26.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high-pressure, intermediate-pressure, and low-pressure turbines 17, 18, 19 before being exhausted through the nozzle 20 to provide some propulsive thrust. The high-pressure turbine 17 drives the high-pressure compressor 15 by a suitable interconnecting shaft 27. The low-pressure compressor 14 drives the intermediate-pressure turbine 18 via a shaft 28.

Note that the terms "low-pressure turbine" and "low-pressure compressor" as used herein may be taken to mean the lowest pressure turbine stages and lowest pressure compressor stages (i.e. not including the fan 13) respectively and/or the turbine and compressor stages that are connected together by the interconnecting shaft 26 with the lowest rotational speed in the engine. In some literature, the "low-pressure turbine" and "low-pressure compressor" referred to herein may alternatively be known as the "intermediate-pressure turbine" and "intermediate-pressure compressor". Where such alternative nomenclature is used, the fan 13 may be referred to as a first, or lowest pressure, compression stage.

Other turbofan gas turbine engines to which the present disclosure may be applied may have alternative configurations. For example, such engines may have an alternative number of fans and/or compressors and/or turbines and/or an alternative number of interconnecting shafts. By way of further example, the gas turbine engine shown in FIG. 1 has a split flow nozzle 20, 23 meaning that the flow through the bypass duct 22 has its own nozzle 23 that is separate to and radially outside the core engine nozzle 20. However, this is not limiting, and any aspect of the present disclosure may also apply to engines in which the flow through the bypass duct 22 and the flow through the core engine 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the turbofan gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 2:
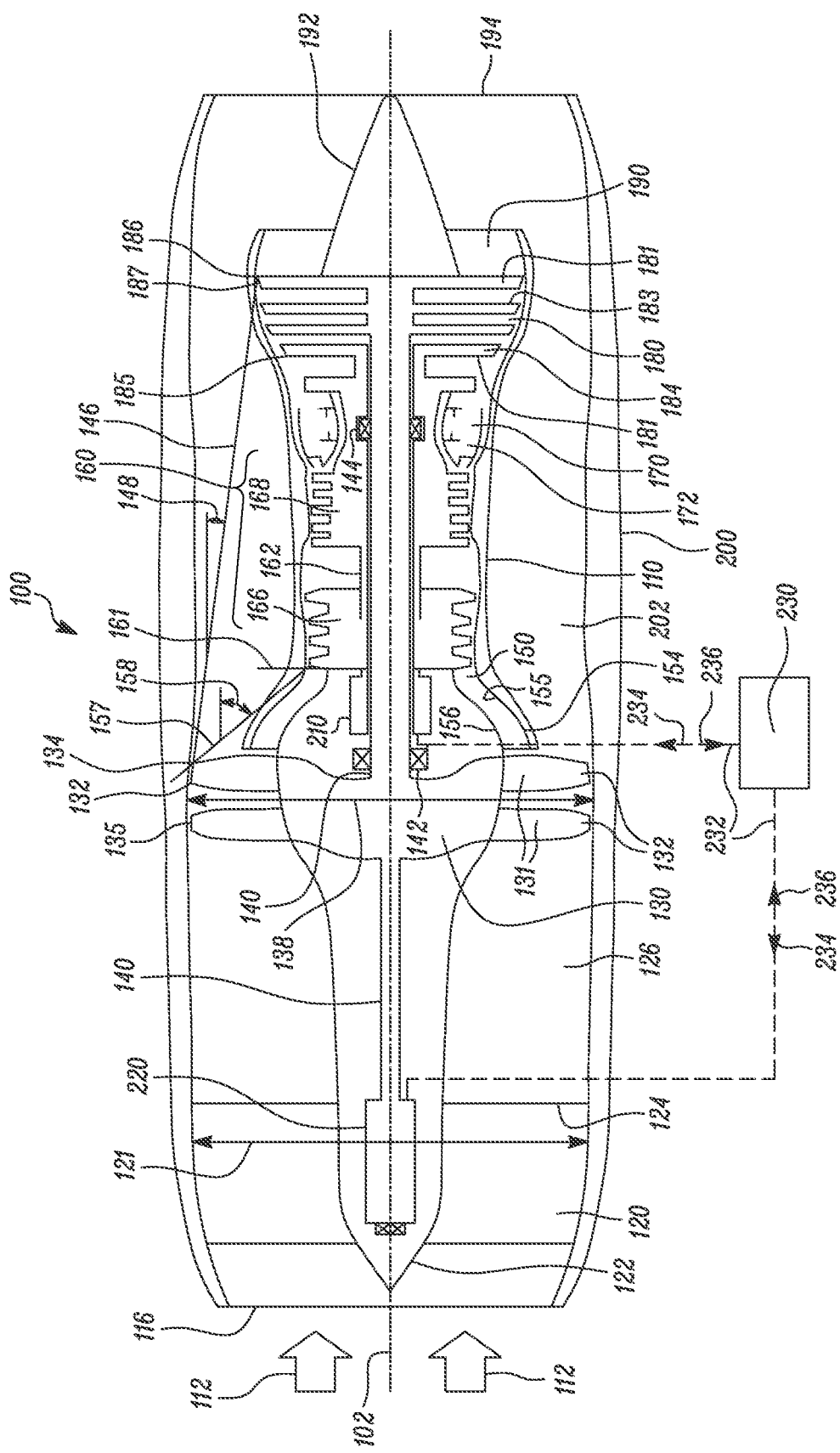
FIG. 2 shows a schematic sectional view of a turbofan gas turbine engine according to a first embodiment of the disclosure.

Referring to FIG. 2, a turbofan gas turbine engine according to a first embodiment of the disclosure is designated generally by the reference numeral 100. The turbofan gas turbine engine 100 comprises in axial flow sequence, a heat exchanger module 120, a fan assembly 130, a compressor module 160 including an intermediate-stage compressor 166 and a high pressure compressor 168, a combustor module 170, a turbine module 180, and an exhaust module 190. The gas turbine engine 100 has an axial length L 104 between an inlet face 116 of the engine 100 to an exhaust face 194 of the engine.

The gas turbine engine 100 has a longitudinal axis 102 being the rotational axis 102 of the compressor and turbine assemblies 160, 180. The gas turbine engine 100 has a first side 105 and a second side 106 defined as opposing sides of the rotational axis 102 in a direction extending from an exhaust face 194 of the gas turbine engine 100 to an inlet face 116 of the gas turbine engine 100. The first side 105 is the left side of the engine 100 in a direction from the exhaust face 194 to the inlet face 116. Likewise the second side 106 is the right side of the engine 100 in a direction from the exhaust face 194 to the inlet face 116.

An axial direction is defined as being in the direction of the axis of rotation 102 of the gas turbine engine 100. Axial constraint 264 is provided in the axial direction. A lateral direction is defined as being perpendicular to the axis of rotation 102 of the gas turbine engine 100 and as extending in the direction of the left and right sides 105, 106 of the gas turbine engine 100. Lateral constraint 262 is provided in the lateral direction. A vertical direction is defined as being perpendicular to the axis of rotation 102 of the gas turbine engine 100 and also perpendicular to the lateral direction of the gas turbine engine 100. Vertical constraint 260 is provided in the vertical direction.

The fan assembly 130 (also termed a low-pressure compressor) is rotationally connected to the low-pressure turbine 181 by an LP shaft 140. The compressor assembly 160 is rotationally connected to the high-pressure turbine 183 by an HP shaft 162.

In the present arrangement, the fan assembly 130 comprises two fan stages 131, with each fan stage 131 comprising a plurality of fan blades 132. In the present arrangement each fan stage 131 has the same fan diameter 138, with the respective plurality of fan blades defining a fan diameter of 0.9 m. Each fan blade 132 has a leading edge 133 and a corresponding trailing edge 134. The fan assembly 130 comprises, in axial flow sequence, a lowest pressure fan stage and a highest pressure fan stage.

In an alternative arrangement, the two fan stages 131 may have different fan diameters 136 each defined by the corresponding plurality of fan blades 132. As previously mentioned, the fan diameter ($D_{FAN}$) 136 is defined by a circle circumscribed by the leading edges of the respective plurality of fan blades 132.

The turbine module 180 comprises, in axial flow sequence, a low-pressure turbine 181 and a high-pressure turbine 183. Each of the low pressure turbine 181 and high pressure turbine 183 has a turbine stage comprising a row of turbine blades 184, with each of the turbine blades 184 extending radially outwardly and having a leading edge 185 and a corresponding trailing edge 186.

A fan tip axis 146 is defined as extending from a radially outer tip 135 of the leading edge 133 of one of the plurality of fan blades 132 of the highest pressure fan stage 131, to a radially outer tip 187 of the trailing edge 186 of one of the turbine blades 184 of the lowest pressure turbine stage 181. The fan tip axis 146 extends in a longitudinal plane which contains a centreline of the gas turbine engine 102, and a fan axis angle 148 is defined as the angle between the fan tip axis 146 and the centreline 102. In the present embodiment, the fan axis angle has a value of 18 degrees.

The heat exchanger module 120 comprises a plurality of heat transfer elements 124 extending radially outwardly from a central hub 122. The heat exchanger module 120 is in fluid communication with the fan assembly 130 by an inlet duct 126. The heat exchange module 120 has an axial length of 0.4 m, this being 0.4 times the fan diameter of 0.9 m.

The inlet duct 126 extends between a downstream-most face of the heat transfer elements and an upstream-most face of the fan assembly. In the present arrangement, the inlet duct 126 is linear. However, in other arrangements the inlet duct 126 may be curved or convoluted.

The inlet duct 126 has a fluid path length of 3.6 m, this being 4.0 times the fan diameter of 0.9 m. The fluid path length extends along a central axis 102 of the inlet duct 126.

The heat exchanger module 120 has a flow area ($A_{HEX}$). The heat exchanger module flow area is the cross-sectional area of the heat exchanger module 120 through which an air flow 112 passes before being ingested by the fan assembly 130. In the present arrangement, the heat exchanger module flow area has an annular cross-section and corresponds directly to the shape of the air flow passing through the heat exchanger module 120.

The fan assembly 130 has a corresponding flow area ($A_{FAN}$). The fan assembly flow area is the cross-sectional area of the fan assembly 130 through which an air flow 112 passes before separating into a core engine flow and a bypass flow. The fan assembly flow area has an annular shape since it corresponds to the annular area swept by the fan blades 132.

The fan assembly 130 is fluidly connected to the compressor module 160 by an intermediate duct 150. The intermediate duct 150 directs a proportion of the inlet air flow 112 into the core engine 110. The intermediate duct 150 extends axially rearwards and radially inwards.

In the present arrangement, the heat exchanger module flow area is equal to the fan assembly flow area, and the corresponding ratio of $A_{HEX}/A_{FAN}$ is equal to 1.0.

The heat exchanger module 120 has a flow diameter (E) 121, which is the diameter of the air flow passing through the heat exchanger module 120. In the present arrangement, the heat exchanger module flow diameter 121 is equal to the fan diameter 136.

The heat exchanger module 120 comprises a plurality of heat transfer elements 124 for the transfer of heat energy from a first fluid 275 contained within the heat transfer elements 124 to an airflow 112 passing over a surface of the heat transfer elements 124 prior to entry of the airflow 112 into the fan assembly 130. In the present embodiment, the first fluid 275 is a mineral oil. In other arrangements, the first fluid 275 may be an alternative heat transfer fluid such as, for example, a water-based fluid, or the fuel used by the turbofan gas turbine engine.

The heat transfer elements 124 have a conventional tube and fin construction and will not be described further. In an alternative arrangement, the heat transfer elements 124 may have a different construction such as, for example, plate and shell.

The turbofan gas turbine engine 100 further comprises an outer housing 200. The outer housing 200 fully encloses the sequential arrangement of the heat exchanger module 120, inlet duct 126, fan assembly 130, compressor module 160, combustor module 170, and turbine module 180. The outer housing 200 defines a bypass duct 202 between the outer housing 200 and the core engine components (comprising inter alia the compressor module 160 and the turbine module 180). In the present arrangement, the bypass duct 202 has a generally axi-symmetrical annular cross-section extending over the core engine components. In other arrangements, the bypass duct 202 may have a non-symmetric annular cross-section or may not extend around a complete circumference of the core engine components.

A first electric machine 210 is rotationally connected to the HP shaft 162 axially upstream of the compressor assembly 160. The first electric machine 210 does not extend axially beyond an inlet plane 161 of the compressor module 160. The first electric machine 210 has an axial length 212 $L_{EM}$ and a diameter 214 $D_{EM}$. A ratio of the axial length 212 to the diameter 214 ($L_{EM}/D_{EM}$) for the first electric machine 210 is 1.2.

The first electric machine 210 may operate as an electric motor and rotationally drive the HP shaft 162. Alternatively, the first electric machine 210 may operate as an electric generator, in which arrangement it is rotationally driven by the HP shaft 162.

The first electric machine 210 is electrically connected to an electrical energy storage unit 230 by an electrical connection 232. In the present arrangement, the electrical energy storage unit 230 takes the form of a battery pack 230. When the first electric machine 210 is operating as an electric generator, electrical energy 236 is routed via the electrical connection 232 to the electrical energy storage unit 230. Likewise, electrical energy 234 may be directed from the electrical energy storage unit 230 to the first electric machine 210 when the first electric machine is operating as an electric motor.

A second electric machine 220 is positioned upstream of the fan assembly 130 and accommodated within the central hub 122 of the heat exchanger module 120. The second electric machine 220 is rotationally connected to the fan assembly 130. As outlined above for the first electric machine 210, the second electric machine 220 is electrically connected to the electrical energy storage unit 230 by an electrical connection 232. Likewise, the second electric machine 20 may be operated as an electric generator with electrical energy routed to the electrical energy storage unit 230 via the electrical connection 232. Alternatively, the second electric machine 220 may be operated as an electric motor with electrical energy routed from the electrical energy storage unit 230 via the electrical connection 232.

The HP shaft 162 is supported on a first bearing assembly 142 and second bearing assembly 144. The first bearing assembly 142 is positioned axially between the fan assembly 130 and the first electric machine 210. In the present arrangement, the lowest-pressure fan stage 131 extends axially partially over the first bearing assembly 142.

Figure 3:
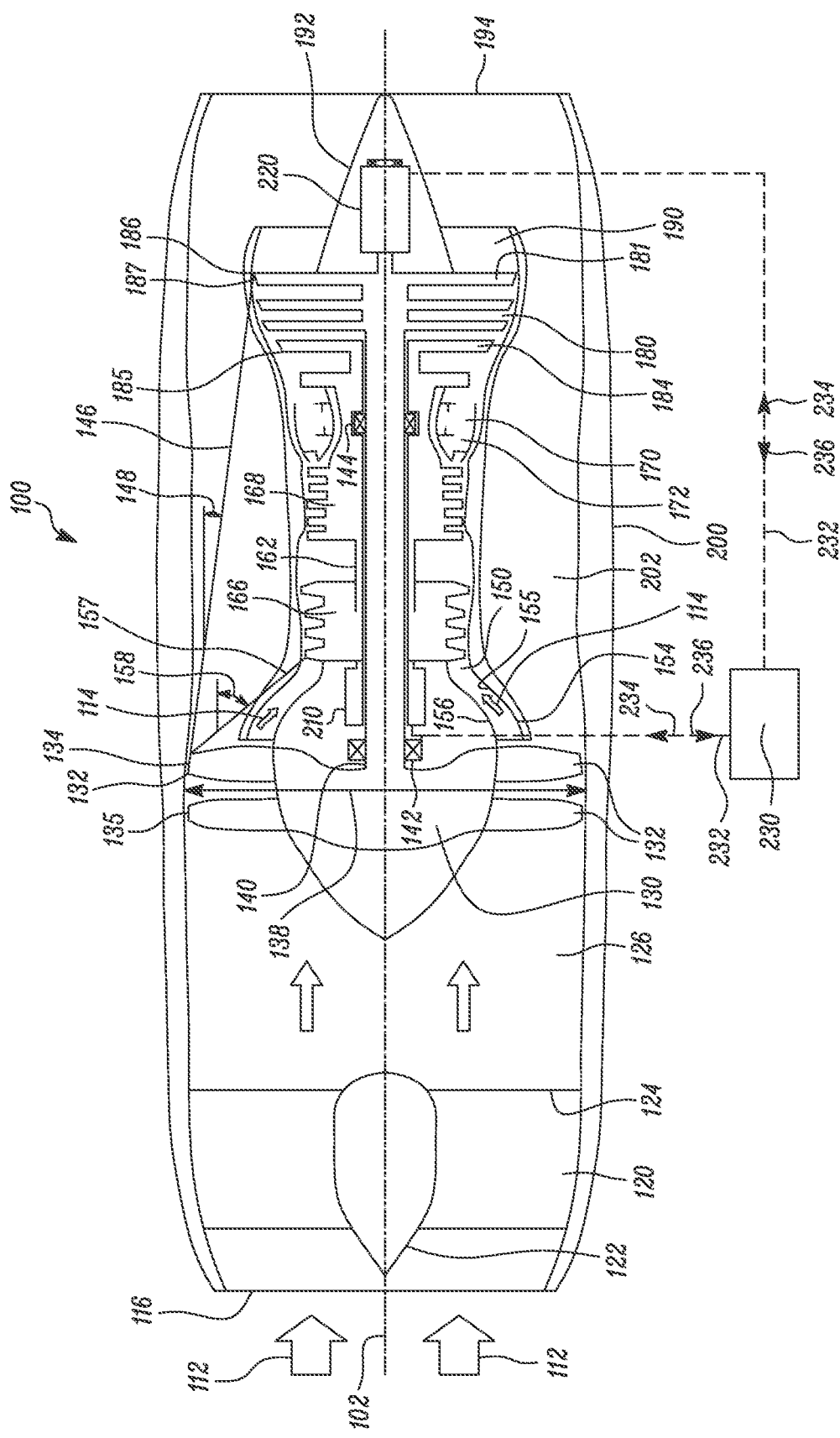
FIG. 3 shows a schematic sectional view of a turbofan gas turbine engine according to a second embodiment of the disclosure.

FIG. 3 shows a turbofan gas turbine engine according to a second embodiment of the disclosure. The gas turbine engine of FIG. 3 broadly corresponds to that of the first embodiment shown in FIG. 2 and described above.

However, in the arrangement of FIG. 3, the second electric machine 220 is positioned in a tail cone 192 of the core engine 110. As described above, the second electric machine 220 is rotationally connected to the LP shaft 140, connecting the fan assembly 130 to the turbine module 180.

Figure 4:
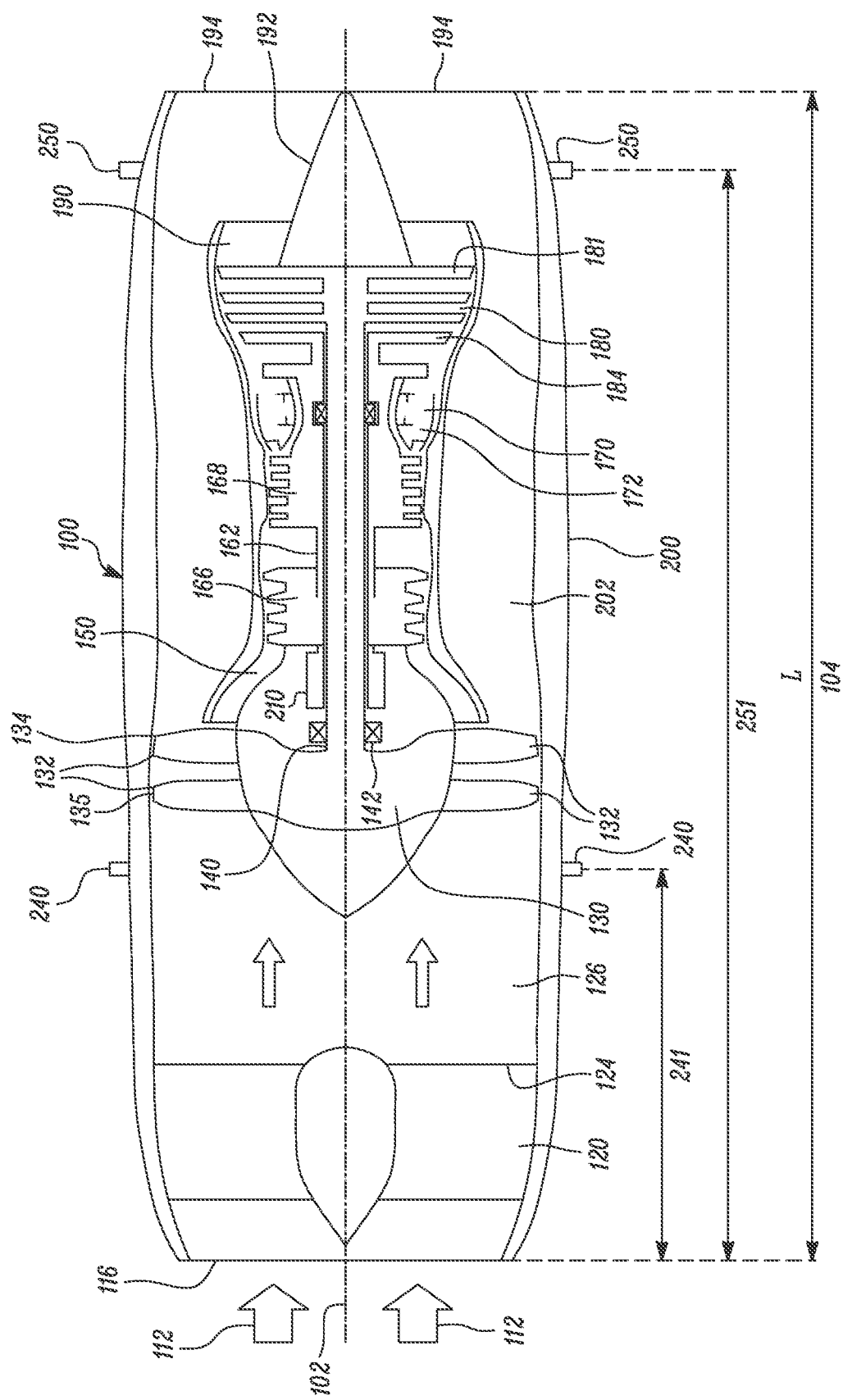
FIG. 4 shows a schematic sectional view of a turbofan gas turbine engine according to a third embodiment of the disclosure.

FIG. 4 a turbofan gas turbine engine according to a third embodiment of the disclosure. The embodiment of FIG. 4 differs from the earlier embodiments of FIGS. 2 and 3 in that the gas turbine engine of FIG. 4 comprises only a first electric machine 210, and not the first and second electric machines 210,220 forming part of the FIGS. 2 and 3 arrangements.

The embodiment of FIG. 4 is therefore simpler than those of FIGS. 2 and 3, while retaining the advantages of an embedded electric machine of power generation, core engine working line optimisation, and autonomous ground and in-flight starting.

Shows a further view of the embodiment of FIG. 3 with the addition of the first engine mount plane 240 and the second engine mount plane 250. The first engine mount plane 240 is positioned at a distance of 0.3*L from the inlet face 116 of the engine 100. The second engine mount plane 250 is positioned at a distance of 0.9*L from the inlet face 116 of the engine 100.

Figure 5:
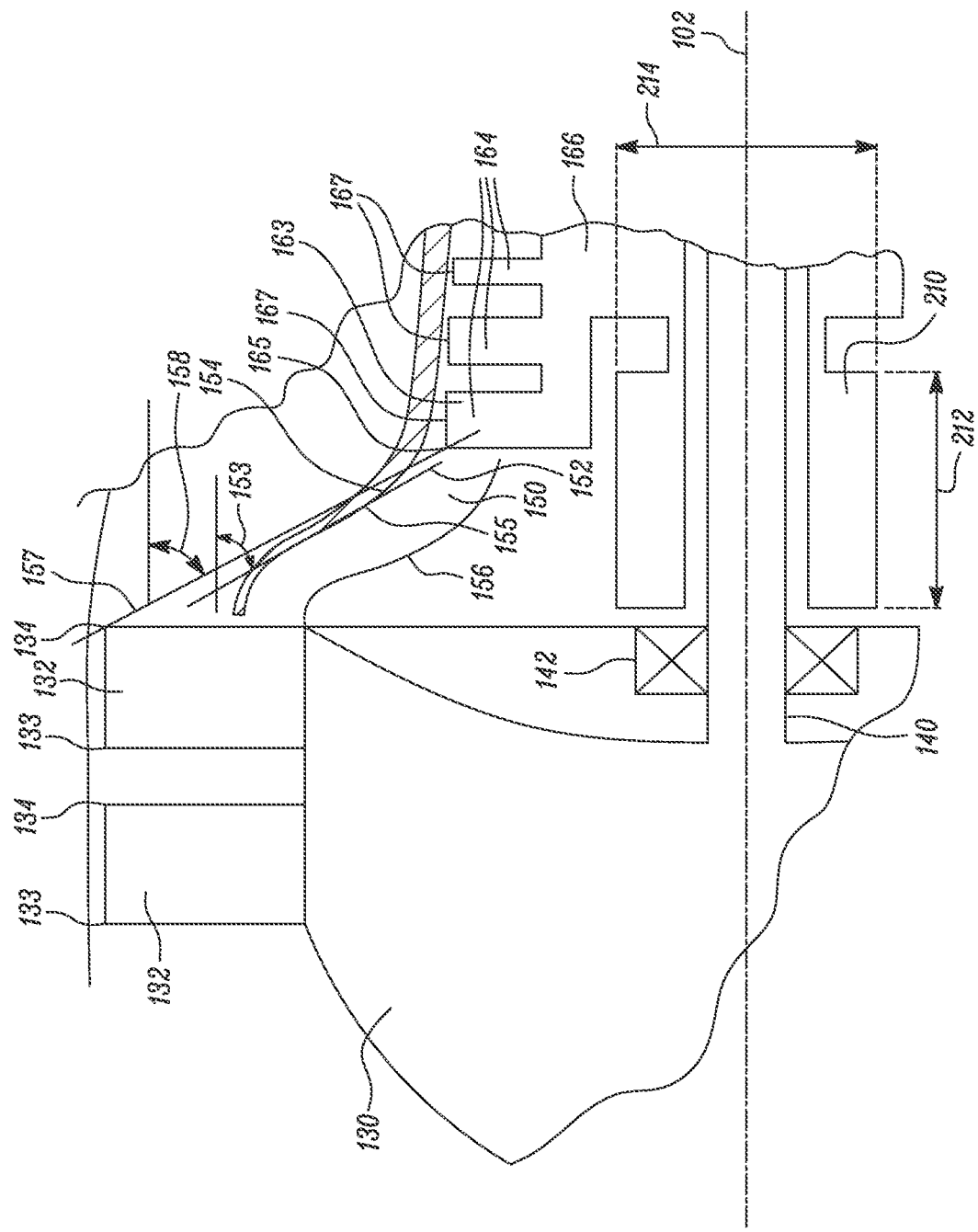
FIG. 5 shows a schematic sectional partial view of the intermediate duct of the turbofan gas turbine engine of any of FIGS. 2 to 4.

FIG. 5 shows an enlarged partial schematic sectional view of the intermediate duct 150 between the fan assembly 130 and the compressor module 160. An intermediate flow axis 157 is defined extending from a radially outer tip 135 of a trailing edge 134 of one of the plurality of fan blades 132 of the highest pressure fan stage 131, to a radially outer tip 167 of a leading edge 165 of one of the plurality of compressor blades 164 of the lowest-pressure compressor stage 163. The intermediate flow axis 157 lies in a longitudinal plane containing the centreline of the gas turbine engine 102. An intermediate flow axis angle 158 is defined as the angle between the intermediate flow axis 157 and the centreline 102.

The intermediate flow axis angle 158 has a value of −30 degrees. In other words, in the direction extending from the inlet face 116 of the turbofan engine 100 to the exhaust face 194 of the turbofan engine, the intermediate flow axis angle 158 is inclined in a radially inwardly direction.

The intermediate duct 150 comprises a radially outer wall 154 and an opposite radially inner wall 156. A radially inwardly facing surface 155 of the radially outer wall 154 has an outer intermediate duct wall angle 153 of −30 degrees. The intermediate duct 150 may have a partially serpentine geometry. In such an instance, for example where the intermediate duct 150 is not linear, the outer intermediate duct wall angle 153 is defined as the corresponding angle of a tangent to the radially inwardly facing surface 155 of the radially outer wall 154 at a mid-point along the intermediate duct 150.

In the arrangement illustrated in FIG. 5, the highest-pressure fan stage 131 extends axially completely over the first bearing assembly 142. In other words, the first bearing assembly 142 is axially enclosed by the fan assembly 130.

FIGS. 6 through 16 show a number of alternative engine mounting configurations. For each configuration the corresponding figure shows a front mount 240, labelled 'F', and a rear mount 250, labelled 'CR'. In all instances, the view of the front mount 240 and the rear mount 250 is looking forward from the rear of the engine to the front of the engine.

Figure 6:
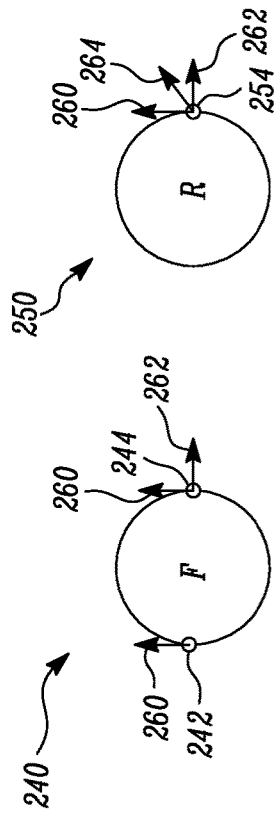
FIG. 6 shows a schematic view of the front and rear engine mount planes of a further embodiment of the disclosure.

FIG. 6 shows a front mount 240 in which a mounting frame 248 attaches to both the first side 105 of the engine 100, and the second side 106 of the engine 100. The mounting frame 248 provides vertical constraint 260, lateral constraint 262, and axial constraint 264 to the engine 100. The rear mount 250 of FIG. 6 comprises at the second engine mount plane position 251, a first side engine mount point 252, a centre engine mount point 256, and a second side engine mount point 254. The first side engine mount point 252 provides vertical constraint 260 to the engine 100. The centre engine mount point 256 provides lateral constraint 262, and axial constraint 264 to the engine 100. The second side engine mount point 254 provides vertical constraint 260 to the engine 100.

Figure 7:
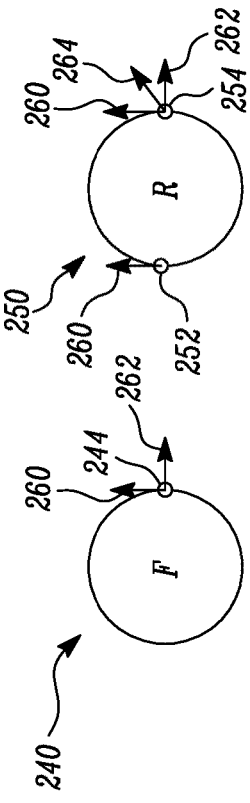
FIG. 7 shows a schematic view of the front and rear engine mount planes of a further embodiment of the disclosure.

FIG. 7 shows a front mount 240 comprising, at the first engine mount plane position 241, a first side engine mount point 242, and a second side engine mount point 244, the first side engine mount point 242 provides vertical constraint 260 to the engine 100, and the second side engine mount point 244 provides vertical constraint 260 to the engine 100. The rear mount 250 of FIG. 7 comprises, at the second engine mount plane position 251, a first side engine mount point 252, and a second side engine mount point 254, the first side engine mount point 252 provides axial constraint 264 to the engine, and the second side engine mount point 254 provides vertical constraint 260, lateral constraint 262, and axial constraint 264 to the engine 100.

Figure 8:
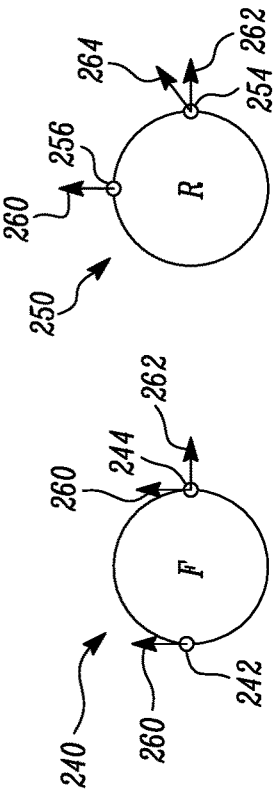
FIG. 8 shows a schematic view of the front and rear engine mount planes of a further embodiment of the disclosure.

FIG. 8 shows a front mount 240 comprising, at the first engine mount plane position 241, a second side engine mount point 244, the second side engine mount point 244 providing vertical constraint 260 to the engine 100. The rear mount 250 of FIG. 8 comprises, at the second engine mount plane position 251, a first side engine mount point 252, and a second side engine mount point 254, the first side engine mount point 252 provides vertical constraint 260, and axial constraint 264 to the engine 100, and the second side engine mount point 254 provides vertical constraint 260, lateral constraint 262, and axial constraint 264 to the engine 100.

Figure 9:
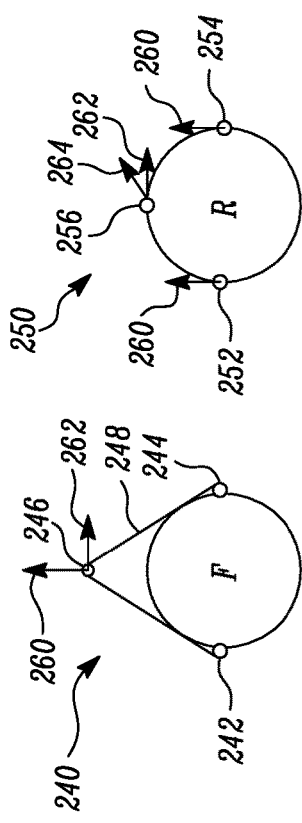
FIG. 9 shows a schematic view of the front and rear engine mount planes of a further embodiment of the disclosure.

FIG. 9 shows a front mount 240 comprising, at the first engine mount plane position 241, a first side engine mount point 242, and a second side engine mount point 244, the first side engine mount point 242 providing vertical constraint 260 to the engine 100, and the second side engine mount point 244 provides vertical constraint 260, and lateral constraint 262 to the engine 100. The rear mount 250 of FIG. 9 comprises, at the second engine mount plane position 251, a second side engine mount point 254, the second side engine mount point 254 provides vertical constraint 260, lateral constraint 262, and axial constraint 264 to the engine 100.

Figure 10:
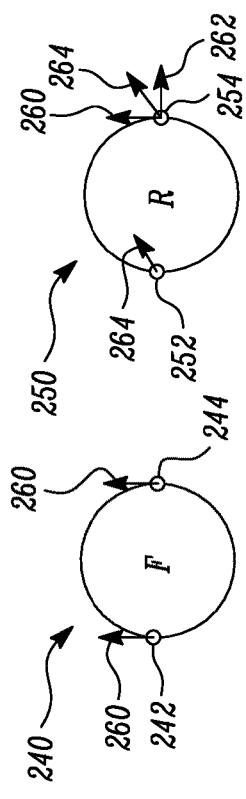
FIG. 10 shows a schematic view of the front and rear engine mount planes of a further embodiment of the disclosure.

FIG. 10 shows a front mount 240 comprising, at the first engine mount plane position 241, a second side engine mount point 244, the second side engine mount point 244 provides vertical constraint 260, and lateral constraint 262 to the engine 100. The rear mount 250 of FIG. 10 comprises, at the second engine mount plane position 251, a first side engine mount point 252, and a second side engine mount point 254, the first side engine mount point 252 provides vertical constraint 260 to the engine 100, and the second side engine mount point 254 provides vertical constraint 260, lateral constraint 262, and axial constraint 264 to the engine 100.

Figure 11:
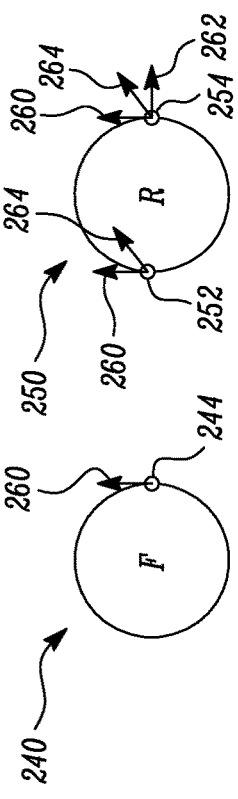
FIG. 11 shows a schematic view of the front and rear engine mount planes of a further embodiment of the disclosure.

FIG. 11 shows a front mount 240 comprising, at the first engine mount plane position 241, a first side engine mount point 242, and a second side engine mount point 244, the first side engine mount point 242 provides vertical constraint 260 to the engine 100, and the second side engine mount point 244 provides vertical constraint 260 and lateral constraint 262 to the engine 100. The rear mount 250 of FIG. 11 comprises, at the second engine mount plane position 251, a centre engine mount point 256, and a second side engine mount point 254, the centre engine mount point 256 provides vertical constraint 260 to the engine 100, and the second side engine mount point 254 provides lateral constraint 262, and axial constraint 264 to the engine 100.

FIG. 12 shows a front mount 240 comprising, at the first engine mount plane position 241, a first side engine mount point 242, and a second side engine mount point 244, the first side engine mount point 242 provides vertical constraint 260 to the engine 100, and the second side engine mount point 244 provides vertical constraint 260 to the engine 100. The rear mount 250 of FIG. 12 comprises, at the second engine mount plane position 251, a first side engine mount point 252, a centre engine mount point 256, and a second side engine mount point 254, the first side engine mount point 252 provides axial constraint 264 to the engine 100, the centre engine mount point 256 provides vertical constraint 260 to the engine 100, and the second side engine mount point 254 providing lateral constraint 262, and axial constraint 264 to the engine 100.

FIG. 13 shows a front mount 240 comprising, at the first engine mount plane position 241, a second side engine mount point 244, and a centre engine mount point 246, the second side engine mount point 244 provides lateral constraint 262 to the engine 100, and the centre engine mount point 246 providing vertical constraint 260 to the engine 100. The rear mount 250 of FIG. 13 comprises, at the second engine mount plane position 251, a first side engine mount point 252, and a second side engine mount point 254, the first side engine mount point 252 provides vertical constraint 260 to the engine 100, and the second side engine mount point 254 provides vertical constraint 260, lateral constraint 262, and axial constraint 264 to the engine 100.

FIG. 14 shows a front mount 240 comprising, at the first engine mount plane position 241, a centre engine mount point 246, the centre engine mount point 246 provides vertical constraint 260 to the engine 100. The rear mount 250 of FIG. 14 comprises, at the second engine mount plane position 251, a first side engine mount point 252, and a second side engine mount point 254, the first side engine mount point 252 provides vertical constraint 260, and axial constraint 264 to the engine 100, and the second side engine mount point 254 provides vertical constraint 260, lateral constraint 262, and axial constraint 264 to the engine 100.

FIG. 15 shows a front mount 240 in which a mounting frame 248 attaches to both the first side 105 of the engine 100, and the second side 106 of the engine 100. The mounting frame 248 provides vertical constraint 260, lateral constraint 262, and axial constraint 264 to the engine 100. The rear mount 250 of FIG. 15 comprises, at the second engine mount plane position 251, a first side engine mount point 252, and a second side engine mount point 254, the first side engine mount point 252 provides vertical constraint 260 to the engine 100, and the second side engine mount point 254 provides vertical constraint 260, lateral constraint 262, and axial constraint 264 to the engine 100.

FIG. 16 shows a front mount 240 in which a mounting frame 248 attaches to both the first side 105 of the engine 100, and the second side 106 of the engine 100. The mounting frame 248 provides vertical constraint 260, lateral constraint 262, and axial constraint 264 to the engine 100. The rear mount 250 of FIG. 16 comprises, at the second engine mount plane position 251, a first side engine mount point 252, and a second side engine mount point 254, the first side engine mount point 252 provides vertical constraint 260 and axial constraint 264 to the engine 100, and the second side engine mount point 254 provides vertical constraint 260 and axial constraint 264 to the engine 100.

Figure 17:
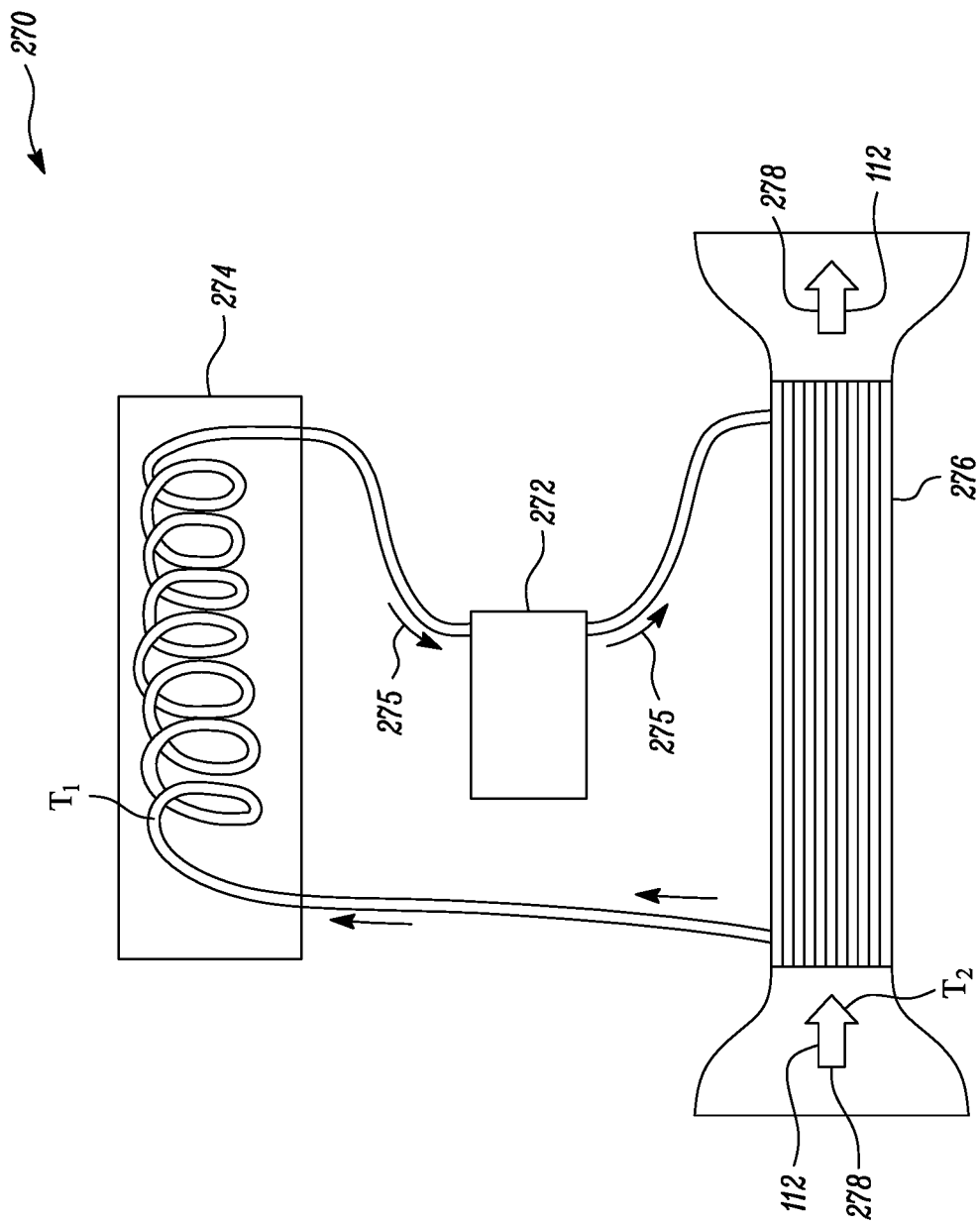
FIG. 17 shows a schematic view of a cooling system for an aircraft, according to a further embodiment of the disclosure.

Referring to FIG. 17, a cooling system for an aircraft 270 comprises a vapour cycle machine 272, an ancillary apparatus 274 and a heat exchanger 276. The vapour cycle machine 272 operates using a conventional vapour compression cycle and its detailed operation with regard to this thermodynamic cycle will not be discussed further.

Circulating within the ancillary apparatus 274 is a first fluid 275, which in one embodiment is a conventional water/ethylene glycol mixture. Alternatively, the first fluid 275 may be, for example, a water/propylene glycol mixture, or a working fluid used in the gas turbine engine such as, for example, lubricating oil, or fuel.

The first fluid 275 circulates through the ancillary apparatus 274 to provide cooling to the ancillary apparatus 274. The first fluid 275 then passes through the vapour cycle machine 276 that raises the temperature $T_1$ of the first fluid 275 by approximately 25° C. The first fluid 275 then passes through the heat exchanger 276. In the present embodiment, the heat exchanger 276 comprises the heat transfer elements 124 that form part of the heat exchanger module 120.

As explained above, the heat exchanger module 120 is configured to transfer heat energy from the first fluid 275 to a second fluid 278, which in this embodiment is the inlet air flow 112 entering the gas turbine engine.

Raising the temperature of the first fluid 275 ensures that the first fluid temperature $T_1$ is greater than the temperature $T_2$ of the second fluid 278, i.e. the inlet air flow 112. This means that the heat exchanger 276 can transfer eat energy from the hotter first fluid 275 to the cooler inlet air flow 112.

In the present embodiment, the first fluid has a temperature $T_1$ of approximately 30° C. After passing through the vapour cycle machine 276, this first fluid temperature $T_1$ has been raised to approximately 55° C. In one example, the temperature $T_2$ of the air flow 112 (i.e. the second fluid 275) passing through the heat exchanger 276 is approximately 28° C. Consequently, a ratio of the temperature $T_1$ of the first fluid 275 to the temperature $T_2$ of the air flow 112 is approximately 2.

After passing through the heat exchanger module 120, the first fluid 275, having had its temperature reduced by the transfer of heat energy to the inlet air flow 112, then returns to the ancillary apparatus 274 to continue to provide cooling to the ancillary apparatus 274.

Figure 18:
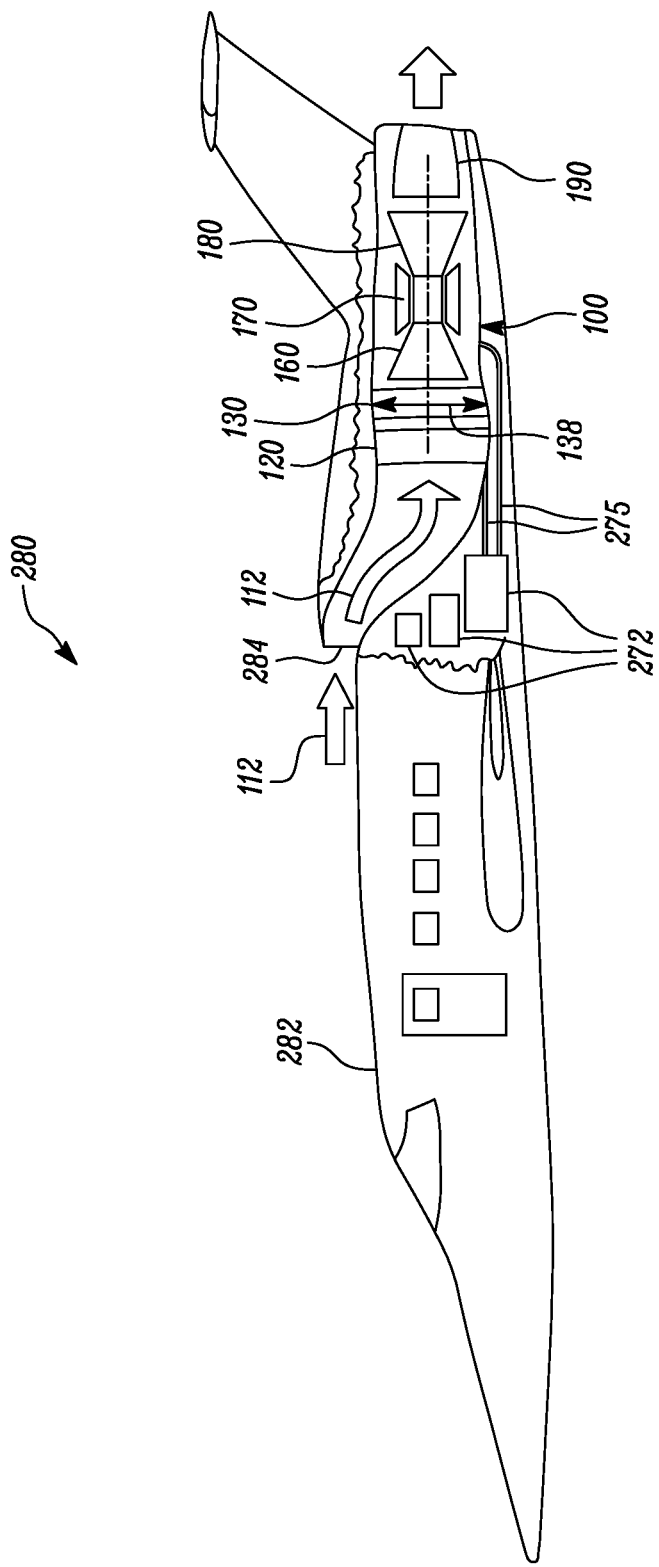
FIG. 18 shows a schematic perspective view of an aircraft according to a further embodiment of the disclosure.

Referring to FIG. 18, an aircraft according to an embodiment of the disclosure is designated by the reference numeral 280. The aircraft 280 comprises a machine body 282 in the form of a fuselage with wings and a tail plane. The machine body 282 encloses a turbofan gas turbine engine 100, together with a plurality of ancillary apparatus 274.

When operating at a full power condition, the gas turbine engine 100 of any of the described embodiments will have a corrected core engine mass flow rate of approximately 20 kg/sec. The term Corrected Mass Flow Rate is the mass flow rate that would pass through the core engine 110 if the inlet pressure and temperature corresponded to ambient conditions at Sea Level Static (SLS) for the International Standard Atmosphere (ISA). These pressure and temperature conditions are 1; 013,25 mb (29.92 in) and 15° C. (59° F.).

All of the above-mentioned embodiments of the gas turbine engine 100 have a combustor volume 172 of approximately 30,000 cm³. The term combustor volume 172 means the total volume of the combustor module 170 where fuel is burnt.

As outlined earlier, the gas turbine engine 100 may be characterised by a ratio T being defined as:

$$T = \frac{\text{(Maximum Corrected Core Mass Flow} = Q)}{\text{(Combustor volume} = V)}$$

where T has a value of 667.

The above-mentioned embodiment of FIG. 4 comprises a first electric machine that is configured to generate a maximum electrical power of 300 kW. Also as outlined earlier, an alternative characterisation of the gas turbine engine may employ a ratio V defined as:

$$V = \frac{\text{(Total Electrical Power Generated} = P_{EM})}{\text{(Combustor volume} = V)}$$

where V has a value of 10×10⁶.

In one arrangement of the turbofan gas turbine engine 100, for example that shown in FIG. 4, the engine provides a maximum dry thrust at SLS[1] conditions of 50 kN. It is known from experimental testing that this arrangement of the gas turbine engine produces approximately 10 MW of shaft power from the low-pressure shaft, and approximately 12.5 MW from the high-pressure shaft; i.e. a total maximum shaft power output of 22.5 MW. These shaft power figures correspond to operation of the gas turbine engine at a full-power condition at Sea Level Static (SLS) conditions and in an International Standard Atmosphere (15° C./1, 013.25 mb).

[1] In the present example, the SLS (Sea Level Static) conditions are considered to also be at ISA Standard Atmosphere conditions (1,013.25 mb/15° C.).

The first electric machine 210, when configured as a generator can produce a maximum electrical power output of 300 kW. Consequently, a ratio R of:

$$R = \frac{\text{(Total Electrical Power Generated} = P_{EM1})}{\text{(Total Shaft Power} = P_{SHAFT})}$$

has a value of 0.013.

Taking the example of the alternative arrangement of the turbofan gas turbine engine 100 of, say, FIG. 2, having both a first electric machine 210 and a second electric machine 220, again with both electric machines 210,220 configured as electric generators, the maximum electrical power output is approximately 500 kW. In this alternative arrangement, the ratio takes a value of 0.022.

In the present example, at the full power engine condition, the maximum electrical power output (500 kW) from an engine arrangement having both a first electric machine 210 and a second electric machine 220 as a proportion of the total maximum shaft power is approximately 2.2%[2].

[2](500,000/22,500,000)=0.022

In an alternative operating condition of the turbofan gas turbine engine 100, the engine may be installed in an aircraft that in a cruise condition, such as an airspeed of, for example, Mn0.6, generates approximately 5 MW of total shaft power (i.e. sum of the low pressure shaft power and the high pressure shaft power). In such an operating condition, the maximum electrical power output (500 kW) from an engine arrangement having both a first electric machine 210 and a second electric machine 220 as a proportion of the total maximum shaft power is approximately 10.0%[3]. It is clear that in such an alternative operating condition, the total electrical generating capacity of the turbofan gas turbine engine 100 is a significantly higher proportion of the engine' power output than in the case for turbofan gas turbine engines.

[3](500,000/5,000,000)=0.10

The heat exchanger module 120 is configured to dissipate a total waste heat energy to the inlet air flow 112 of approximately 300 kW. A measure of the capability of the gas turbine engine to dissipate heat energy for a given electrical power generation capacity is provided by the ratio S of:

$$S = \frac{\text{(Total Electrical Power Generated} = P_{EM1})}{\text{(Total Heat Energy Rejected to Airflow} = Q)}$$

having a value of 1.00.

In the alternative arrangement of, say, FIG. 2 in which the turbofan gas turbine engine 100 has both a first electric machine 210 and a second electric machine 220, the ratio S takes a value of 1.67.

Note that the terms "low-pressure turbine" and "low-pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine. In some literature, the "low-pressure turbine" and "low-pressure compressor" referred to herein may alternatively be known as the "intermediate-pressure turbine" and "intermediate-pressure compressor". Where such alternative nomenclature is used, the fan 23 may be referred to as a first, or lowest pressure, compression stage.

Other gas turbine engines to which the present disclosure may be applied may have alternative configurations. For example, such engines may have an alternative number of compressors and/or turbines and/or an alternative number of interconnecting shafts. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

In addition, where a range of values is provided, it is understood that every intervening value, between the upper and lower limit of that range and any other stated or intervening value in that stated range, is encompassed within the invention.

Except where mutually exclusive, any of the features may be employed separately or in combination with any other features and the disclosure extends to and includes all combinations and sub-combinations of one or more features described herein.

The invention claimed is:

1. A gas turbine engine for an aircraft, the gas turbine engine comprising, in axial flow sequence, a heat exchanger module, and a core engine, the core engine comprising, in axial flow sequence, an intermediate-pressure compressor, a high-pressure compressor, a high pressure turbine, and a low-pressure turbine, the high-pressure compressor being rotationally connected to the high-pressure turbine by a first shaft, the intermediate-pressure compressor being rotationally connected to the low-pressure turbine by a second shaft, the heat exchanger module being in fluid communication with the core engine by an inlet duct, the heat exchanger module comprising a central hub and a plurality of heat transfer elements extending radially outwardly from the central hub and spaced in a circumferential array, for transfer of heat energy from a first fluid contained within the heat transfer elements to an inlet airflow passing over a surface of the heat transfer elements prior to entry of the airflow into an inlet to the core engine, and wherein the gas turbine engine further comprises a first electric machine and a second electric machine, the first electric machine is rotationally connected to the first shaft, the first electric machine is positioned downstream of the heat exchanger module relative to a direction of the airflow, and the second electrical machine is rotationally connected to the second shaft, the first electric machine is coaxial with the first shaft, and the entire first electric machine is positioned upstream of the intermediate-pressure compressor.

2. The gas turbine engine as claimed in claim 1, wherein the second electric machine is accommodated within the central hub.

3. The gas turbine engine as claimed in in claim 1, wherein the second electric machine is positioned axially downstream of the low-pressure turbine.

4. The gas turbine engine as claimed in claim 1, wherein the first electric machine is positioned axially upstream of the core engine.

5. The gas turbine engine as claimed in claim 1, wherein at least one of the first electric machine and the second electric machine, comprises an axial length LEM and a diameter DEM, and wherein a ratio of the axial length to the diameter (LEM/DEM) for the respective electric machine is in a range between 0.5 to 2.0.

6. The gas turbine engine as claimed in claim 1, further comprising an electrical energy storage unit, and wherein the electrical energy storage unit is configured to store electrical energy that may be generated by at least one of the first electrical machine and the second electrical machine.

7. The gas turbine engine as claimed in claim 6, wherein the electrical energy storage unit is a battery.

8. The gas turbine engine as claimed in claim 6, wherein the electrical energy storage unit is a capacitor.

9. The gas turbine engine as claimed in claim 1, wherein the gas turbine engine further comprises a fan assembly, the fan assembly being rotationally connected to the second shaft.

10. The gas turbine engine as claimed in claim 9, wherein the second electrical machine is rotationally connected to the fan assembly.

11. The gas turbine engine as claimed in claim 9, the fan assembly comprising a plurality of fan blades extending radially from a hub, the plurality of fan blades defining a fan diameter (DFAN), and wherein the fan diameter DFAN is within the range of 0.3 m to 1.4 m.

12. The gas turbine engine as claimed in claim 9, the gas turbine engine further comprising an outer casing, the outer casing enclosing the sequential arrangement of fan assembly, compressor module, combustor module, and turbine module, an annular bypass duct being defined between the outer casing and the sequential arrangement of compressor module, combustor module, and turbine module, a bypass ratio being defined as a ratio of a mass air flow rate through the bypass duct to a mass air flow rate through the sequential arrangement of modules, and wherein the bypass ratio is less than 4.0.

13. The gas turbine engine as claimed in claim 9, wherein the fan assembly has two or more fan stages, at least one of the fan stages comprising a plurality of fan blades defining the fan diameter DFAN.

14. An aircraft comprising a gas turbine engine as claimed in claim 1.

* * * * *